(12) United States Patent
Jung et al.

(10) Patent No.: US 10,197,868 B2
(45) Date of Patent: Feb. 5, 2019

(54) DISPLAY DEVICE AND METHOD OF MANUFACTURING THE SAME

(71) Applicant: SAMSUNG DISPLAY CO., LTD., Yongin-Si, Gyeonggi-Do (KR)

(72) Inventors: Jae Hoon Jung, Seoul (KR); Hyangyul Kim, Hwaseong-si (KR); Hyoung-Joon Kim, Cheonan-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/463,847

(22) Filed: Mar. 20, 2017

(65) Prior Publication Data
US 2018/0031890 A1 Feb. 1, 2018

(30) Foreign Application Priority Data
Jul. 29, 2016 (KR) .................... 10-2016-0097177

(51) Int. Cl.
*G02F 1/1339* (2006.01)
*G02F 1/1343* (2006.01)
(Continued)

(52) U.S. Cl.
CPC ........ *G02F 1/13394* (2013.01); *G02F 1/1368* (2013.01); *G02F 1/133514* (2013.01); *G02F 1/134309* (2013.01); *G02F 1/133345* (2013.01); *G02F 1/133512* (2013.01); *G02F 1/133723* (2013.01); *G02F 2001/13398* (2013.01);
(Continued)

(58) Field of Classification Search
CPC ........... G02F 1/13394; G02F 1/133514; G02F 1/1368; G02F 1/134309; G02F 2001/13398; G02F 2201/123; G02F 2001/133354; G02F 2001/133519; G02F 1/133512; G02F 2201/54; G02F 1/1339; G02F 2001/136222; G02F 2001/13396; G02F 2201/46; G02F 1/133345; G02F 1/133723; H01L 27/124;
(Continued)

(56) References Cited

U.S. PATENT DOCUMENTS 9,239,496 B2 1/2016 Ge et al.
2002/0075443 A1* 6/2002 Shimizu .............. G02F 1/13394
349/155

(Continued)

FOREIGN PATENT DOCUMENTS

KR 1020060070873 6/2006

*Primary Examiner* — Steven Loke
*Assistant Examiner* — Juanita Rhodes
(74) *Attorney, Agent, or Firm* — F. Chau & Associates, LLC

(57) ABSTRACT

A display device includes a first substrate having a first lower column spacer disposed in a peripheral area, extending in a direction, and including first and second opposing slanted sides, a second substrate opposing the first substrate, the second substrate including a first upper column spacer disposed in the first peripheral area, extending in the same direction, including a slanted side, and disposed adjacent to the first side of the first lower column spacer, and a second upper column spacer having substantially a same shape as the first upper column spacer and disposed adjacent to the second side of the first lower column spacer, where the first peripheral area is disposed outside a display area of the display device.

20 Claims, 23 Drawing Sheets

(51) Int. Cl.
*G02F 1/1335* (2006.01)
*G02F 1/1368* (2006.01)
*G02F 1/1337* (2006.01)
*G02F 1/1333* (2006.01)

(52) U.S. Cl.
CPC ............ *G02F 2001/133354* (2013.01); *G02F 2001/133388* (2013.01); *G02F 2001/133519* (2013.01); *G02F 2201/123* (2013.01); *G02F 2201/46* (2013.01); *G02F 2201/54* (2013.01)

(58) Field of Classification Search
CPC ............ H01L 29/78633; G09G 3/3648; G09G 2300/0439
See application file for complete search history.

(56) References Cited

U.S. PATENT DOCUMENTS

| | | | | |
|---|---|---|---|---|
| 2004/0150319 | A1* | 8/2004 | Tomimatsu | H01L 27/3246 313/495 |
| 2004/0257488 | A1* | 12/2004 | Lee | G02F 1/136227 349/43 |
| 2005/0161740 | A1* | 7/2005 | Park | H01L 27/3253 257/347 |
| 2008/0117377 | A1* | 5/2008 | Chan | G02F 1/1339 349/153 |

* cited by examiner ously a same shape as the first upper column spacer and disposed adjacent to the second side of the first lower column spacer, where the first peripheral area is disposed outside a display area of the display device.

In an exemplary embodiment, the display device further includes a second lower column spacer disposed in a second peripheral area of the display device outside the display area, extending in a second direction, and including third and fourth opposing slanted sides, a third upper column spacer disposed in the second peripheral area of the second substrate, extending in the second direction, including a slanted side, and disposed adjacent to the third side of the second lower column spacer, and a fourth upper column spacer having substantially a same shape as the third upper column spacer and disposed adjacent to the fourth side of the second lower column spacer.

In an exemplary embodiment, the display device further includes a switching element disposed on the first substrate and including a gate electrode, a source electrode and a drain electrode, the source electrode and the drain electrode overlapping with the gate electrode, and an organic layer disposed on the switching element.

In an exemplary embodiment, the first lower column spacer is disposed on the organic layer.

In an exemplary embodiment, the organic layer includes a concave pattern portion extending in the first direction, wherein the first lower column spacer is disposed on the concave pattern portion.

In an exemplary embodiment, the organic layer includes a convex pattern portion extending in the first direction, wherein the first lower column spacer is disposed on the convex pattern portion.

In an exemplary embodiment, the second lower column spacer is disposed on the organic layer.

In an exemplary embodiment, the organic layer includes a concave pattern portion extending in the second direction, wherein the second lower column spacer is disposed on the concave pattern portion.

In an exemplary embodiment, the organic layer includes a convex pattern portion extending in the second direction, wherein the second lower column spacer is disposed on the convex pattern portion.

In an exemplary embodiment, the display device further includes a color filter layer disposed on the display area of the second substrate, a dummy color filter layer disposed on the peripheral area of the second substrate and disposed on substantially a same layer as the color filter layer, and an overcoated layer disposed on the color filter layer and the dummy color filter layer, wherein the first and second upper column spacers is disposed on the overcoated layer.

A method of manufacturing a display device according to an exemplary embodiment of the inventive concept includes: forming a first lower column spacer in a first peripheral area on a first substrate, the first lower column spacer extending in a first direction and including first and second opposing slanted sides; and forming first and second upper column spacers in a first peripheral area on a second substrate, the first upper column spacer extending in the first direction and including a slanted side, the second upper column spacer having substantially the same shape as the first upper column spacer, wherein the substrates oppose one another and the first peripheral area is disposed outside a display area of the display device.

In an exemplary embodiment, the method further includes forming a second lower column spacer in a second peripheral area on the first substrate, the second lower column spacer extending in a second direction and including third and fourth opposing sides; and forming third and fourth upper column spacers in the second peripheral area on the

DISPLAY DEVICE AND METHOD OF MANUFACTURING THE SAME

CROSS-REFERENCE TO RELATED APPLICATIONS

This application claims priority under 35 U.S.C. § 119 to Korean Patent Application No. 10-2016-0097177, filed on Jul. 29, 2016 in the Korean Intellectual Property Office KIPO, the disclosure of which is incorporated by reference in their entireties.

BACKGROUND

1. Technical Field

Exemplary embodiments of the present inventive concept relate to a display device and a method of manufacturing the display device.

2. Discussion of Related Art

Flat panel display devices such as Flat panel display include a liquid crystal display device (LCD), a plasma display panel (PDP), a field emission display device (FED), and an electrophoretic display device (EPD) and an organic light emitting display device (OLED).

Generally, a liquid crystal display (LCD) panel includes a first substrate including a pixel electrode, a second electrode including a common electrode and a liquid crystal (LC) layer located between the first and second substrates. The first substrate includes a plurality of gate lines, a plurality of data lines crossing the gate lines, a plurality of thin film transistors (TFTs) connected with the gate lines and data lines, and a plurality of pixel electrodes connected with the TFTs. The TFT includes a gate electrode connected to the gate line, a source electrode connected to the data line, and a drain electrode spaced apart from the source electrode.

A column spacer is formed between the first substrate and the second substrate to maintain a cell gap. However, the column spacer is able to maintain the cell gap only against an external force in a vertical direction. Accordingly, the display device may have some defects if the panel is deformed by an external force in a horizontal direction.

SUMMARY

At least one exemplary embodiment of the present inventive concept provides a display device that is capable of reducing defects caused by an external force in a horizontal direction.

At least one exemplary embodiment of the present inventive concept also provides a method of manufacturing the display device.

A display device according to a present exemplary embodiment of the inventive concept includes a first and second opposing substrate. The first substrate includes a first lower column spacer disposed in a first peripheral area of the display device, extending in a first direction, and including first and second opposing slanted sides. The second substrate includes a first upper column spacer disposed in the first peripheral area, extending in the first direction, including a slanted side, and disposed adjacent to the first side of the first lower column spacer, and a second upper column spacer having substantially a same shape as the first upper column spacer and disposed adjacent to the second side of the first second substrate, the third upper column spacer extending in the second direction and including a slanted side, the fourth upper column spacer having substantially the same shape as the third upper column spacer.

In an exemplary embodiment, the method further includes forming a switching element on the first substrate, the switching element including a gate electrode, a source electrode and a drain electrode, the source electrode and the drain electrode overlapping with the gate electrode, and forming an organic layer on the switching element.

In an exemplary embodiment, the first lower column spacer is disposed on the organic layer.

In an exemplary embodiment, the method further includes forming a concave pattern portion on the organic layer, the concave pattern portion extending in the first direction, wherein the first lower column spacer is disposed on the concave pattern portion.

In an exemplary embodiment, the method further includes forming a convex pattern portion on the organic layer, the convex pattern portion extending in the first direction, wherein the first lower column spacer may be disposed on the convex pattern portion.

In an exemplary embodiment, the second lower column spacer is disposed on the organic layer.

In an exemplary embodiment, the method further includes forming a concave pattern portion on the organic layer, the concave pattern portion extending in the second direction, wherein the second lower column spacer is disposed on the concave pattern portion.

In an exemplary embodiment, the method further includes forming a convex pattern portion on the organic layer, the convex pattern portion extending in the second direction, wherein the second lower column spacer is disposed on the convex pattern portion.

In an exemplary embodiment, the method further includes forming a color filter layer on the display area of the second substrate and a dummy color filter layer on the peripheral area of the second substrate, and forming an overcoated layer on the color filter layer and the dummy color filter layer, wherein the first and second upper column spacers are disposed on the overcoated layer.

A display device according to an exemplary embodiment of the inventive concept includes a first substrate, an organic layer disposed on the first substrate in a peripheral area of the display device outside a display area of the display device, a lower column spacer having a trapezoidal shape disposed on the organic layer, the trapezoidal shape comprising first and second slanted and opposing sides, a second substrate, a first upper column spacer disposed in the peripheral area adjacent to the first side on the second substrate and having a third side that mates with the first side, and a second upper column spacer disposed in the peripheral area adjacent to the second side on the second substrate and having a fourth side that mates with the second side.

In an embodiment, the first and third sides slant to the right, and the second and fourth sides slant to the left.

In an embodiment, the organic layer includes a recess and the lower column spacer is disposed on the recess.

In an embodiment, the organic layer includes a raised portion, and the lower column spacer is disposed on the raised portion.

According to at least one embodiment the present inventive concept, a display device includes a first lower column spacer disposed on a first substrate and extending in a first direction and first and second upper column spacers disposed on a second substrate and extending in the first direction. The first lower column spacer may be alternately arranged with the first and second upper column spacers in a cross-sectional view. Thus, under an external force in a second direction crossing the first direction, the first lower column spacer is supported by the first and second upper column spacers so that a panel is prevented from being deformed. In other words, the panel can be prevented from being deformed when an external force is applied in a horizontal direction.

In addition, the display device may further include a second lower column spacer and third and fourth upper column spacers extending in the second direction and having substantially the same shapes as the first lower column spacer and the first and second upper column spacers respectively. Thus, under an external force in the first direction, the panel is prevented from being deformed.

As a result, the panel can be prevented from being deformed when an external force is applied either in a horizontal direction or in a vertical direction.

BRIEF DESCRIPTION OF THE DRAWINGS

The present inventive concept will become more apparent by describing exemplary embodiments thereof in detail with reference to the accompanying drawings, in which.

DETAILED DESCRIPTION OF THE EXEMPLARY EMBODIMENTS

Hereinafter, exemplary embodiments of the present inventive concept will be explained in detail with reference to the accompanying drawings.

Figure 1:
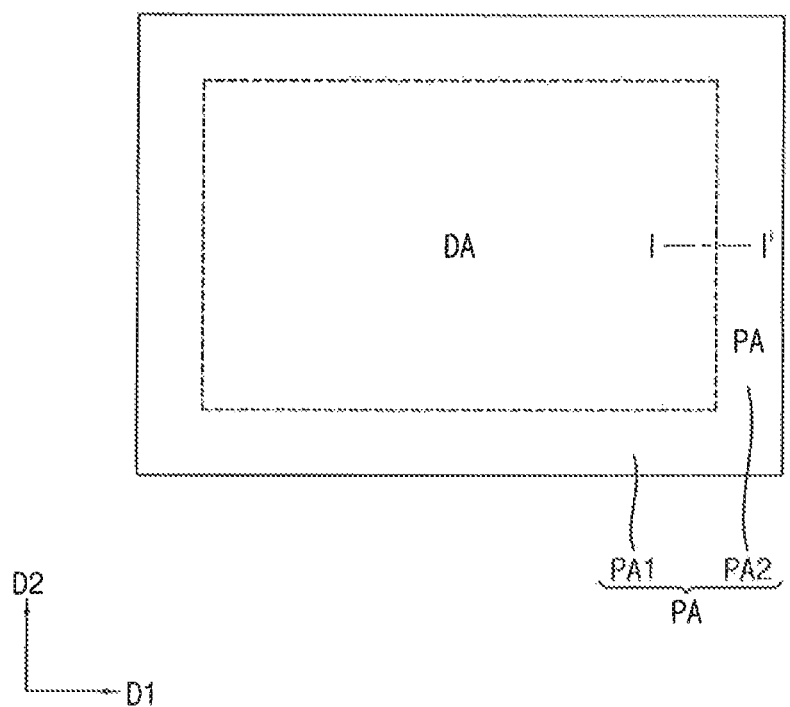
FIG. 1 is a plan view illustrating a display device according to an exemplary embodiment of the inventive concept.
Figure 2:
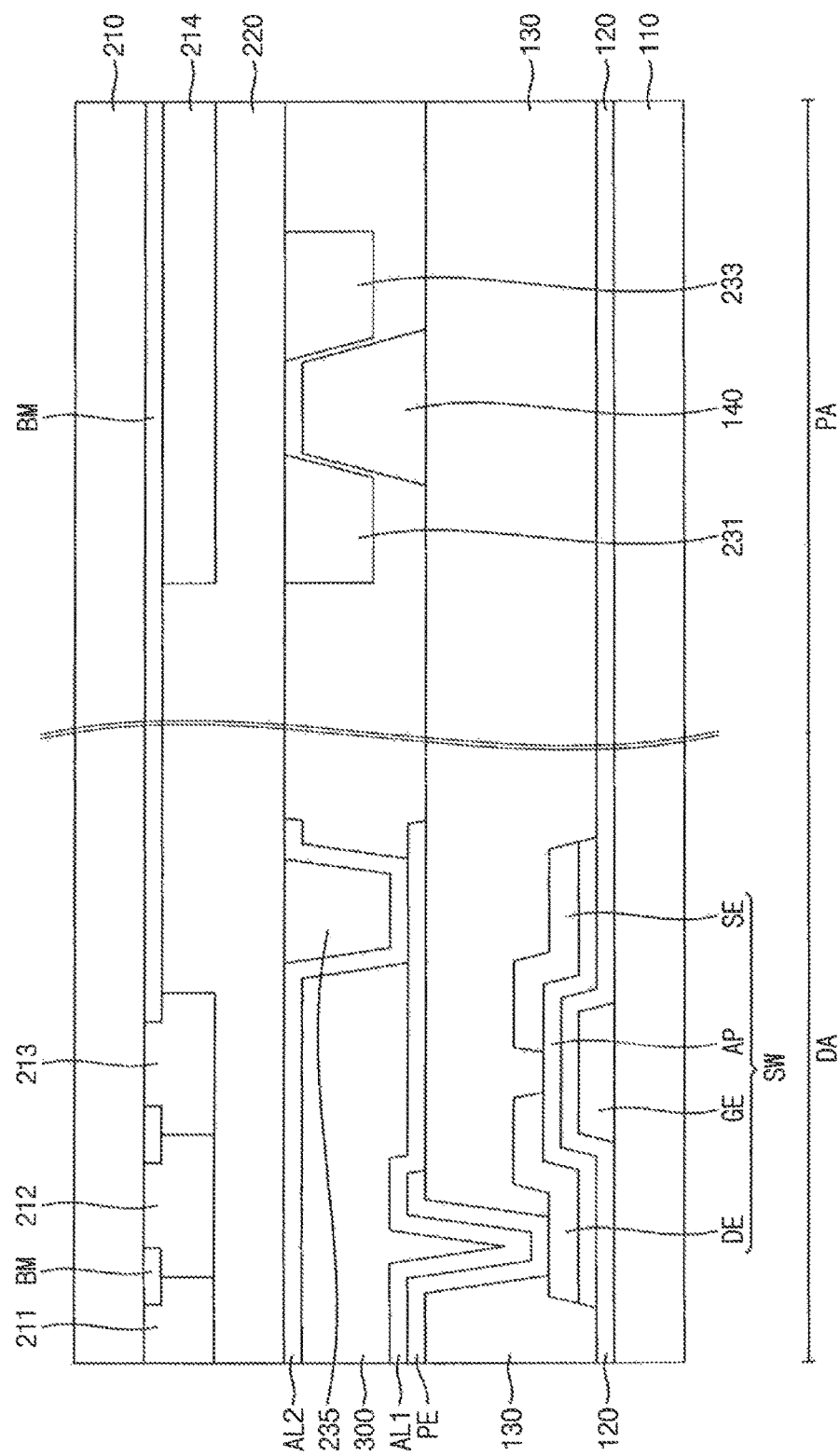
FIG. 2 is a cross-sectional view taken along line I-I' of FIG. 1.

FIG. 1 is a plan view illustrating a display device according to an exemplary embodiment of the inventive concept. FIG. 2 is a cross-sectional view taken along line I-I' of FIG. 1.

Referring to FIGS. 1 and 2, a display device 10 according to the present exemplary embodiment is divided into a display area DA and a peripheral area PA around the display area DA. The display area DA may have a rectangular shape. The peripheral area PA may include a first peripheral area PA1 extending in a first direction D1 and a second peripheral area PA2 extending in a second direction D2 crossing the first direction D1.

The display device 10 includes a first substrate 110, a second substrate 210 opposing the first substrate 110 and a liquid crystal layer 300 disposed between the first substrate 110 and the second substrate 210.

A gate electrode GE, an insulation layer 120, an active pattern AP, a source electrode SE, a drain electrode DE, an organic layer 130, a pixel electrode PE, a first alignment layer AL1 and a first lower column spacer 140 are disposed on the first substrate 110.

The gate electrode GE is disposed on the first substrate 110. The gate electrode GE is electrically connected to a gate line. The gate electrode GE may have a single layer structure including copper (Cu), silver (Ag), chrome (Cr), molybdenum (Mo), aluminum (Al), titanium (Ti), manganese (Mn) and a mixture thereof. Alternatively, the gate electrode GE may have a multi layer structure having a plurality of metal layers including materials different from each other. For example, the gate electrode GE may include a lower layer including titanium (Ti) and an upper layer disposed on an upper part of the lower layer and including copper (Cu).

The insulation layer 120 is formed on the gate electrode GE. The insulation layer 120 covers a conductive pattern including the first substrate 110 and the gate electrode GE. In an embodiment, the insulation layer 120 directly contacts the gate electrode GE and the first substrate 110. The insulation layer 120 may include an inorganic material. For example, the insulation layer 120 may include silicon oxide (SiOx) and/or silicon nitride (SiNx). For example, the insulation layer 120 may include silicon oxide (SiOx), and may have a thickness of about 500 Å. In addition, the insulation layer 120 may include a plurality of layers including materials different from each other.

The active pattern AP is formed on the insulation layer 120. In an embodiment, the active pattern AP directly contacts the insulation layer 120. The active pattern AP is formed on the insulation layer 120 where the gate electrode GE is formed. The active pattern AP overlaps with the gate electrode GE and partially overlaps with each of the source electrode SE and the drain electrode DE. The active pattern AP is disposed between the gate electrode GE and the source electrode SE and between the gate electrode GE and the drain electrode DE.

The source electrode SE and the drain electrode DE is formed on the active pattern AP. In an embodiment, the source electrode SE and the drain electrode DE directly contact the active pattern AP. The source electrode SE and the drain electrode DE are disposed on the active pattern AP spaced apart from each other. The source electrode SE and the drain electrode DE may be formed on a layer on which a data line is formed. The drain electrode DE, gate electrode GE, the active pattern AP, and the source electrode SE together form a switching element SW such as a thin film transistor. In an embodiment, the active pattern AP may be omitted from the switching element SW.

The source electrode SE and the drain electrode DE may have a single layer structure including copper (Cu), silver (Ag), chrome (Cr), molybdenum (Mo), aluminum (Al), titanium (Ti), manganese (Mn) and a mixture thereof. Alternatively, the source electrode SE and the drain electrode DE may have a multi layer structure having a plurality of metal layers including materials different from each other. For example, the source electrode SE and the drain electrode DE may include a copper (Cu) layer and a titanium (Ti) layer formed on an upper and/or lower part of the copper (Cu) layer.

The organic layer 130 is formed on the source electrode SE and the drain electrode DE. In an embodiment, the organic layer 130 directly contacts the source electrode SE and the drain electrode DE. The organic layer 130 planarizes an upper surface of the first substrate 110 so that problems due to a step such as a disconnection of a signal line may be prevented. The organic layer 130 may be an insulation layer including an organic material.

The pixel electrode PE is disposed on the organic layer 130. The pixel electrode PE is electrically connected to the drain electrode DE through a contact hole. The pixel electrode PE may include a transparent conductive material, such as indium tin oxide (ITO) and indium zinc oxide (IZO). In addition, the pixel electrode PE may include titanium (Ti) and/or molybdenum titanium (MoTi).

The first alignment layer AL1 is formed on the pixel electrode PE. The first alignment layer AL1 may be formed in the display area DA. The first alignment layer AL1 may include a polyamide-based compound, a polyelectrolyte-based compound or a mixture thereof.

In an embodiment of the inventive concept, the first lower column spacer 140 is disposed on a second peripheral area PA2 of the first substrate 110. In an embodiment of the inventive concept, the first lower column spacer 140 extends in the second direction D2. In an embodiment of the inventive concept, two sides of the first lower column spacer 140 tilt at an angle towards the first substrate 110. In an embodiment, the first lower column spacer 140 has a trapezoid shape in a cross-sectional view.

In an embodiment, a black matrix BM, a color filter layer, a dummy color filter layer 214, an overcoated layer 220, a first upper column spacer 231, a second upper column spacer 233, a column spacer 235 and a second alignment layer AL2 are disposed on the second substrate 210.

The black matrix BM is disposed on the second substrate 210. In an embodiment, the black matrix BM is in direct contact with the second substrate 210. The black matrix BM may be disposed in the peripheral area PA and between color filters of the display area DA. The black matrix BM is configured to block light.

The color filter layer is disposed on the second substrate 210 on which the black matrix BM is formed. The color filter layer supplies colors to the light passing through the liquid crystal layer 300. For example, a color of light is changed when it passes through the color filter layer. In an embodiment, the color filter layer includes a first color filter 211, a second color filter 212 and a third color filter 213. The first color filter 211 may be a red color filter including red material. The second color filter 212 may be a green color filter including green material. The third color filter 213 may be a blue color filter including blue material. The first through third color filters 211, 212, 213 correspond to each pixel area. The first through third color filters 211, 212, 213 may be arranged to have different colors between pixels adjacent to each other. The first through third color filters 211, 212, 213 may be overlapped with adjacent color filter in a boundary of the adjacent pixel areas. The first through third color filters 211, 212, 213 are disposed in the display area DA of the display device.

The dummy color filter layer 214 is disposed in the peripheral area PA of the display device. In the present exemplary embodiment, the dummy color filter layer 214 may include substantially the same material as one of the first through third color filters 211, 212, 213. The dummy color filter layer 214 may be formed by substantially the same manufacturing process as one of the first through third color filters 211, 212, 213. The dummy color filter layer 214 may have substantially the same height as one of the first through third color filters 211, 212, 213. For example, a height of one of the first through third color filters 211, 212, 213 may be greater than or equal to 1.7 μm and less than or equal to 2.3 μm, and a height of the dummy color filter layer 214 may be greater than or equal to 1.7 μm and less than or equal to 2.3 μm.

The overcoated layer 220 is formed on the first through third color filters 211, 212, 213 and the dummy color filter layer 214. In an embodiment, the overcoated layer 220 directly contacts the first through third color filters 211, 212, 213 and the dummy color filter layer 214. The overcoated layer 220 may minimize a step of the second substrate 210. In addition, the overcoated layer 220 may prevent impurities from flowing into the liquid crystal layer 300. In an alternate embodiment, the overcoated layer 220 is omitted.

The column spacer 235 is disposed on the overcoated layer 220. The column spacer 235 may be disposed in the display area DA and maintain a gap between the first substrate 110 and the second substrate 210. The column spacer 235 may be disposed in the display area DA of the first substrate 110 and be covered by the second alignment layer AL2. In an embodiment, the second alignment layer AL2 directly contacts a left side, a bottom side, and a right side of the column spacer 235.

The second alignment layer AL2 may be formed on the second substrate 210 on which the column spacer 235 is formed. The second alignment layer AL2 may include a polyamide-based compound, a polyelectrolyte-based compound or a mixture thereof.

In an exemplary embodiment of the inventive concept, the first upper column spacer 231 and the second upper column spacer 233 are disposed in the peripheral area PA. In an exemplary embodiment of the inventive concept, the first upper column spacer 231 extends in the second direction D2, includes a side tilted towards the first substrate 110 at substantially the same angle at which the side of the first lower column spacer 140 is tilted, and is disposed adjacent to a first side of the first lower column spacer 140. The second upper column spacer 233 has substantially the same shape as the first upper column spacer 231 and is disposed adjacent to a second side of the first lower column spacer 140. The second side of the first lower column spacer 140 is opposite to the first side of the first lower column spacer 140. In an embodiment, the first upper column spacer 231 and the second upper column spacer 233 have a trapezoid shape in a cross-sectional view.

In an embodiment, a first slanted side (e.g., a side that slants to the right) of the first lower column spacer 140 is configured to mate with an adjacent slanted side (e.g., a side that slants to the right) of the first upper column spacer 231, and a second slanted side (e.g., a side that slants to the left) of the first lower column spacer 140 is configured to mate with an adjacent slanted side (e.g., a side that slants to the left) of the second upper column spacer 233. The first and second upper column spaces 231 and 233 are spaced apart from one another an appropriate distance to enable this mating.

Figure 3:
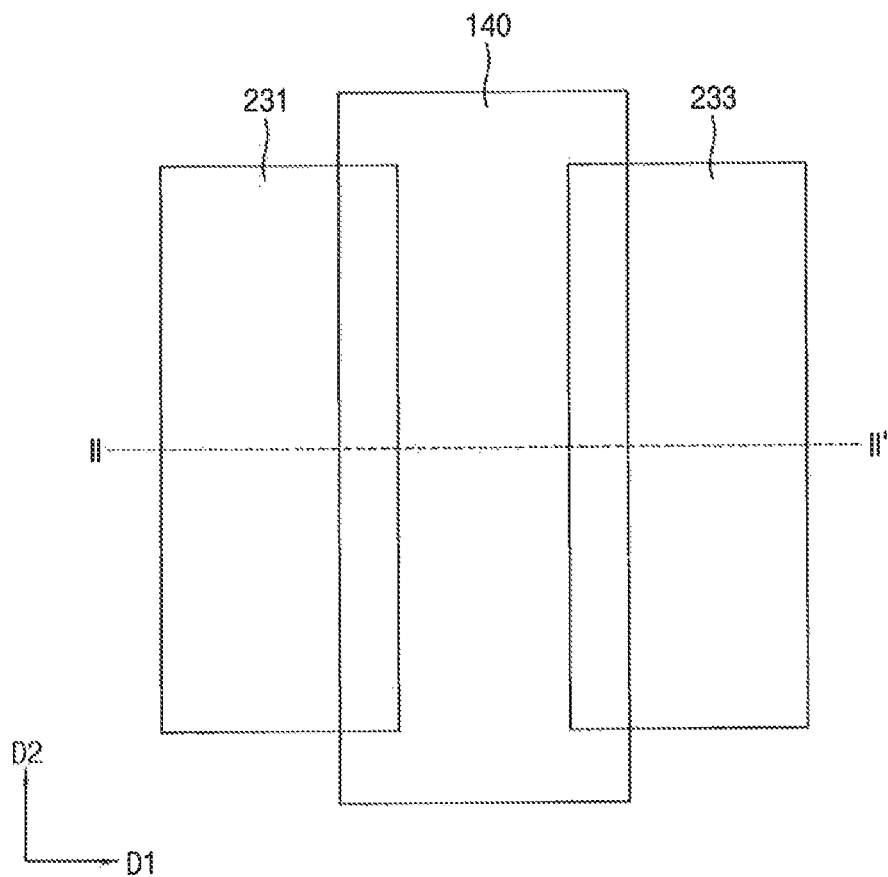
FIG. 3 is a plan view illustrating a first lower column spacer and first and second upper column spacers according to an exemplary embodiment of the inventive concept.
Figure 4:
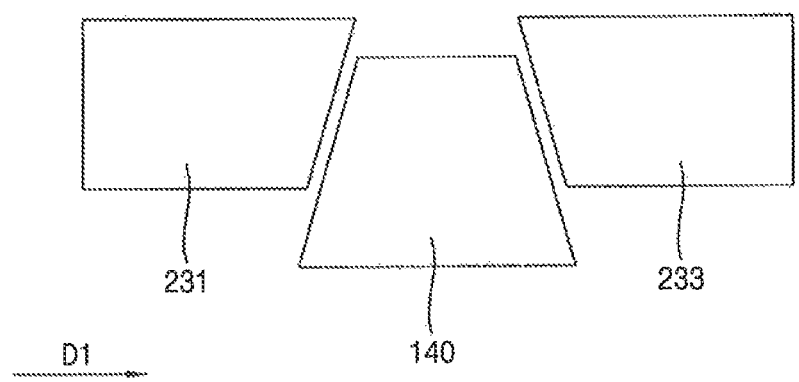
FIG. 4 is a cross-sectional view taken along line II-II' of FIG. 3.

FIG. 3 is a plan view illustrating a first lower column spacer and first and second upper column spacers according to exemplary embodiments of the inventive concept. FIG. 4 is a cross-sectional view taken along the line II-II' of FIG. 3.

Referring to FIGS. 3 and 4, a display device according to a present exemplary embodiment includes a first lower column spacer 140, a first upper column spacer 231 and a second upper column spacer 233.

The first lower column spacer 140 is disposed in the second peripheral area PA2 of the first substrate 110. The first lower column spacer 140 may extend in the second direction D2. In an embodiment, the first lower column spacer 140 includes two sides that tilt toward the first substrate 110 at a certain angle (e.g., an acute angle). In an embodiment, the first lower column spacer 140 has a trapezoid shape in a cross-sectional view.

In an embodiment, the first upper column spacer 231 extends in the second direction D2. In an embodiment, the first upper column spacer 231 includes a side that tilts toward the first substrate 110 at substantially the same angle at which the side of the first lower column spacer 140 is tilted. The first upper column spacer 231 may be disposed adjacent to the first side of the first lower column spacer 140. In an embodiment, the first upper column spacer 231 has a trapezoid shape in a cross-sectional view.

In an exemplary embodiment of the inventive concept, the second upper column spacer 233 has substantially the same shape as the first upper column spacer 231. In an embodiment, the second upper column spacer 233 is disposed adjacent to the second side of the first lower column spacer 140. The second side of the first lower column spacer 140 is opposite to the first side of the first lower column spacer 140. In an embodiment, the second upper column spacer 233 has a trapezoid shape in a cross-sectional view.

In an exemplary embodiment of the inventive concept, the first lower column spacer 140 partially overlaps with the first upper column spacer 231 and the second upper column spacer 233 in a plan view. The first lower column spacer 140 may be alternately arranged with the first upper column spacer 231 and the second upper column spacer 233 in a cross-sectional view. Thus, under an external force in the first direction D1, the first lower column spacer 140 is supported by the first upper column spacer 231 and the second upper column spacer 233 so that a panel is prevented from being deformed. In other words, the panel can be prevented from being deformed when an external force is applied in a horizontal direction.

Figure 5:
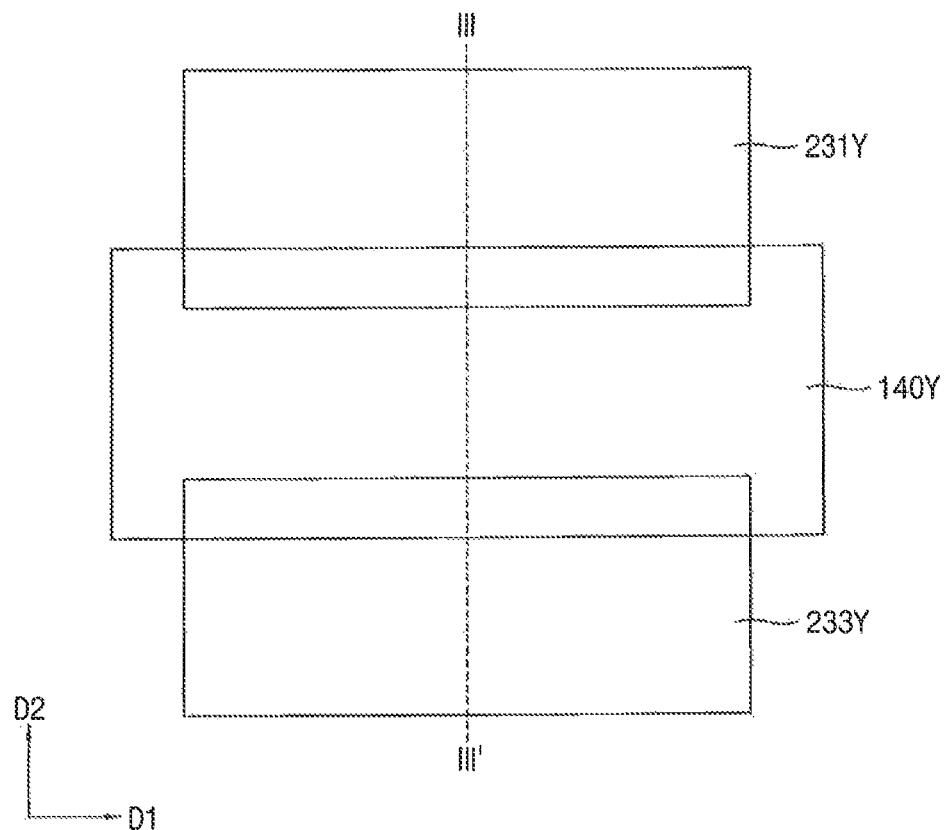
FIG. 5 is a plan view illustrating a second lower column spacer and third and fourth upper column spacers according to an exemplary embodiment of the inventive concept.
Figure 6:
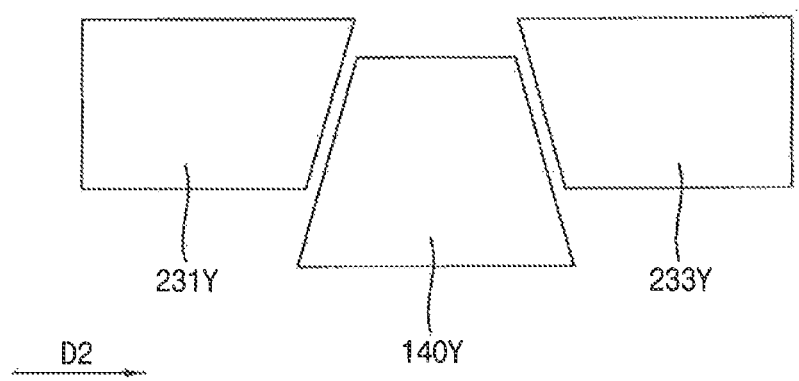
FIG. 6 is a cross-sectional view taken along line III-III' of FIG. 5.

FIG. 5 is a plan view illustrating a second lower column spacer and third and fourth upper column spacers according to an exemplary embodiment of the inventive concept. FIG. 6 is a cross-sectional view taken along line III-III' of FIG. 5.

Referring to FIGS. 5 and 6, a display device according to a present exemplary embodiment includes a second lower column spacer 140Y, a third upper column spacer 231Y and a fourth upper column spacer 233Y.

In an embodiment, the second lower column spacer 140Y is disposed in the first peripheral area PA1 of the first substrate 110. In an embodiment, the second lower column spacer 140Y extends in the first direction D1. In an embodiment, the second lower column spacer 140Y includes two sides tilted toward the first substrate 110 at a certain angle. In an embodiment, the angle of the two sides relative to a bottom of the second lower column spacer is an acute angle. In an embodiment, the second lower column spacer 140Y has a trapezoid shape in a cross-sectional view.

The third upper column spacer 231Y extends in the first direction D1. In an embodiment, the third upper column spacer 231Y includes a side tilted towards the first substrate 110 at substantially the same angle at which the side of the second lower column spacer 140Y is tilted. The third upper column spacer 231Y is disposed adjacent to a first side of the second lower column spacer 140Y. In an embodiment, the third upper column spacer 231Y has a trapezoid shape in a cross-sectional view.

In an embodiment, the fourth upper column spacer 233Y has substantially the same shape as the third upper column spacer 231Y. The fourth upper column spacer 233Y is disposed adjacent to a second side of the second lower column spacer 140Y. The second side of the second lower column spacer 140Y is opposite to the first side of the second lower column spacer 140Y. In an embodiment, the fourth upper column spacer 233Y has a trapezoid shape in a cross-sectional view.

The second lower column spacer 140Y partially overlaps with the third upper column spacer 231Y and the fourth upper column spacer 233Y in a plan view. The second lower column spacer 140Y may be alternately arranged with the third upper column spacer 231Y and the fourth upper column spacer 233Y in a cross-sectional view. Thus, under an external force in the second direction D2, the second lower column spacer 140Y is supported by the third upper column spacer 231Y and the fourth upper column spacer 233Y so that a panel is prevented from being deformed. In other words, the panel can be prevented from being deformed when an external force is applied in a vertical direction.

FIGS. 7 to 17 are cross-sectional views illustrating a method of manufacturing the display device of FIG. 2 according to an exemplary embodiment of the inventive concept.

Figure 7:
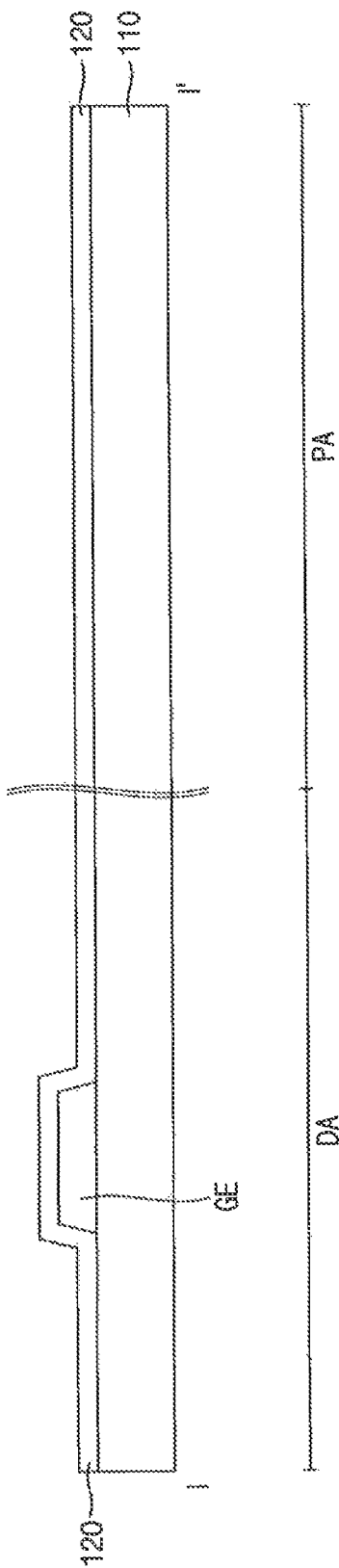
FIGS. 7 to 17 are cross-sectional views illustrating a method of manufacturing the display device of FIG. 2 according to an exemplary embodiment of the inventive concept.

Referring to FIG. 7, a gate electrode GE and an insulation layer 120 are formed on a first substrate 110.

The gate electrode GE is disposed on the first substrate 110. The gate electrode GE is electrically connected to a gate line. The gate electrode GE may have a single layer structure including copper (Cu), silver (Ag), chrome (Cr), molybdenum (Mo), aluminum (Al), titanium (Ti), manganese (Mn) and a mixture thereof. Alternatively, the gate electrode GE may have a multi layer structure having a plurality of metal layers including materials different from each other. For example, the gate electrode GE may include a lower layer including titanium (Ti) and an upper layer disposed on an upper part of the lower layer and including copper (Cu).

The insulation layer 120 is formed on the gate electrode GE. The insulation layer 120 covers a conductive pattern including the first substrate 110 and the gate electrode GE. The insulation layer 120 may include an inorganic material. For example, the insulation layer 120 may include silicon oxide (SiOx) and/or silicon nitride (SiNx). For example, the insulation layer 120 may include silicon oxide (SiOx), and may have a thickness of about 500 Å. In addition, the insulation layer 120 may include a plurality of layers including materials different from each other.

Figure 8:
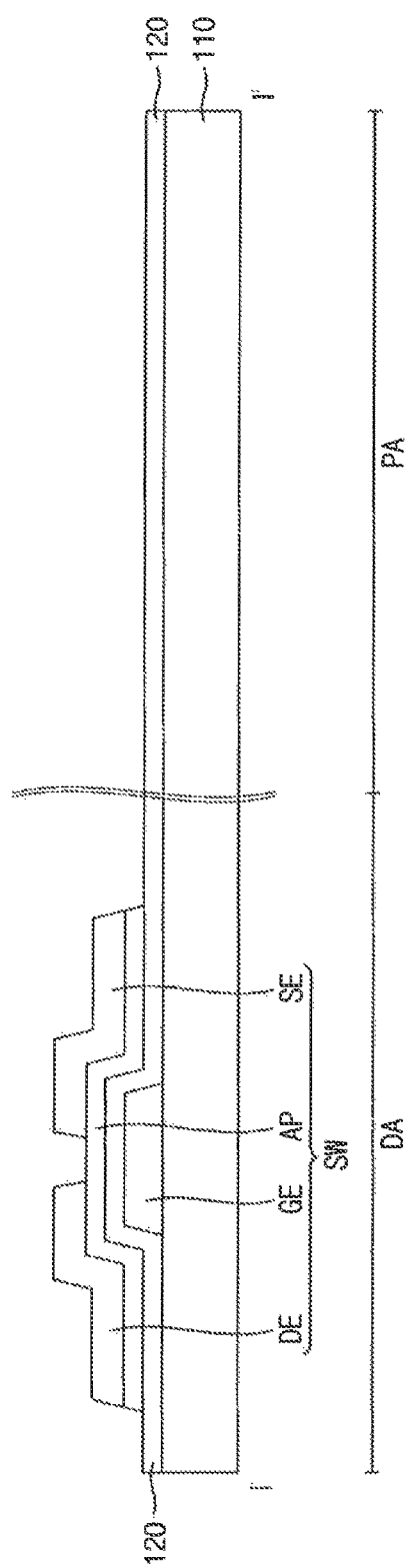

Referring to FIG. 8, an active pattern AP, a source electrode SE and a drain electrode DE are formed on the first substrate 110 on which the insulation layer 120 is formed.

The active pattern AP is formed on the insulation layer 120. The active pattern AP is formed on the insulation layer 120 where the gate electrode GE is formed. The active pattern AP overlaps with the gate electrode GE and partially overlaps with each of the source electrode SE and the drain electrode DE. The active pattern AP is disposed between the gate electrode GE and the source electrode SE and between the gate electrode GE and the drain electrode DE.

The source electrode SE and the drain electrode DE are formed on the active pattern AP. The source electrode SE and the drain electrode DE are disposed on the active pattern AP spaced apart from each other. The source electrode SE and the drain electrode DE may be formed on a layer on which a data line is formed.

The source electrode SE and the drain electrode DE may have a single layer structure including copper (Cu), silver (Ag), chrome (Cr), molybdenum (Mo), aluminum (Al), titanium (Ti), manganese (Mn) and a mixture thereof. Alternatively, the source electrode SE and the drain electrode DE may have a multi layer structure having a plurality of metal layers including materials different from each other. For example, the source electrode SE and the drain electrode DE may include a copper (Cu) layer and a titanium (Ti) layer formed on an upper and/or lower part of the copper (Cu) layer.

Figure 9:
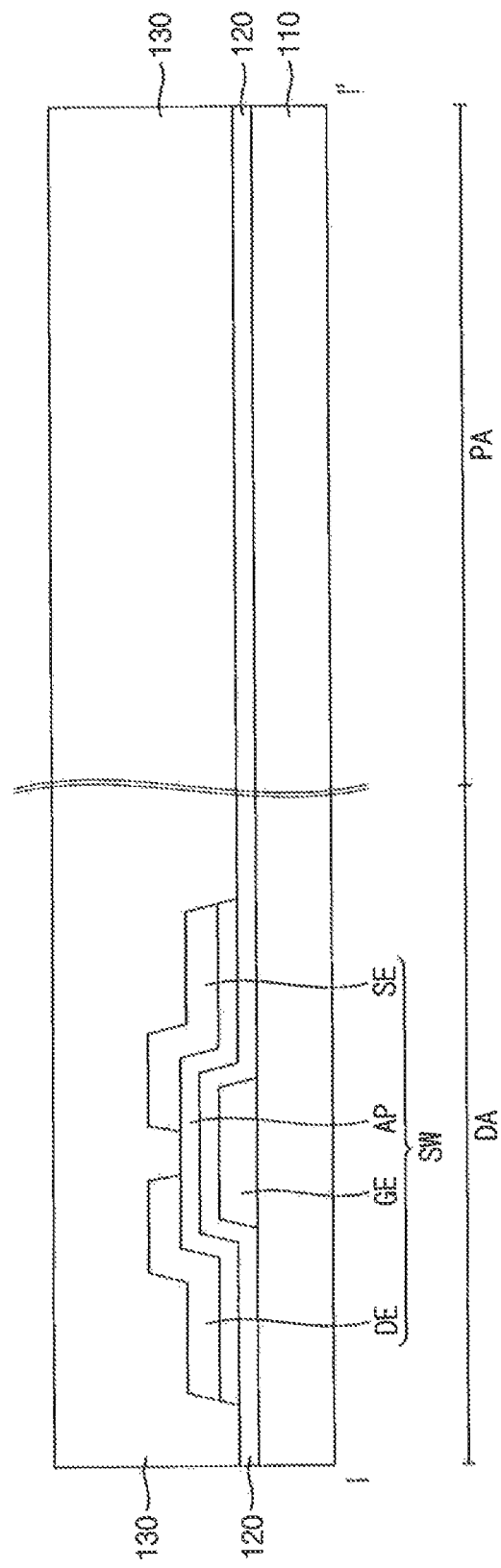

Referring to FIG. 9, an organic layer 130 is formed on the first substrate 110 on which the source electrode SE and the drain electrode DE are formed.

The organic layer 130 is formed on the source electrode SE and the drain electrode DE. The organic layer 130 planarizes an upper surface of the first substrate 110 so that problems due to a step such as disconnection of a signal line may be prevented. The organic layer 130 may be an insulation layer including an organic material.

Figure 10:
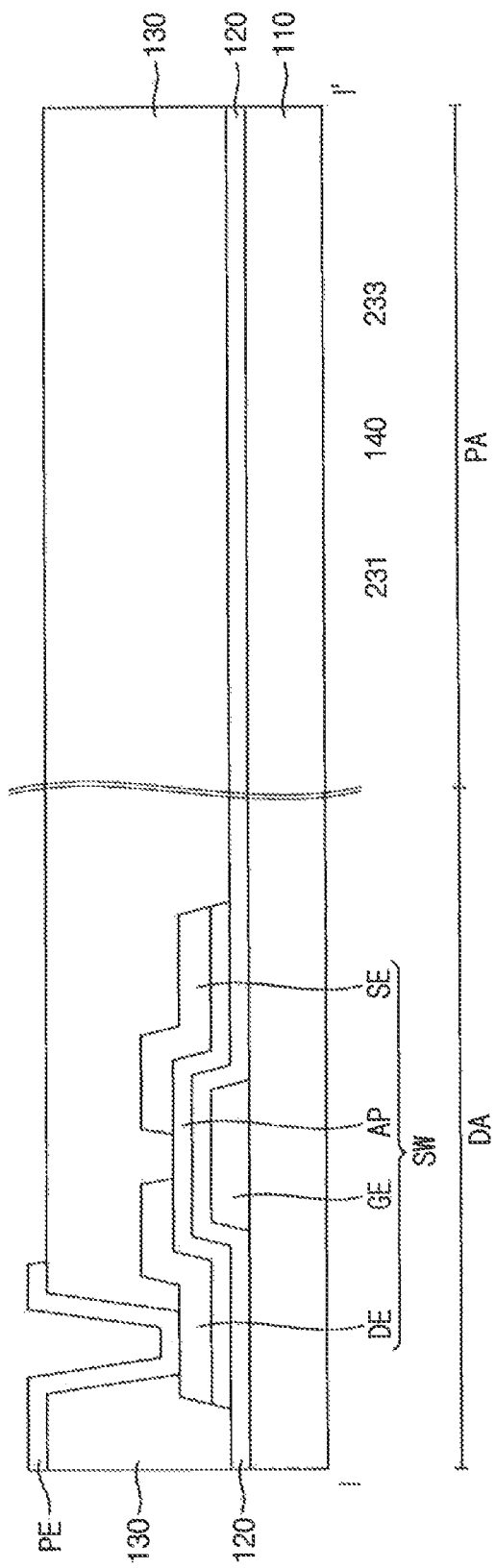

Referring to FIG. 10, a pixel electrode PE is formed on the first substrate 110 on which the organic layer 130 is formed.

The pixel electrode PE is disposed on the organic layer 130. The pixel electrode PE is electrically connected to the drain electrode DE through a contact hole. The contact hole may be formed by removing some of the organic layer 130 to expose the drain electrode DE. The pixel electrode PE may include a transparent conductive material, such as indium tin oxide (ITO) and indium zinc oxide (IZO). In addition, the pixel electrode PE may include titanium (Ti) and/or molybdenum titanium (MoTi). In an embodiment, the pixel electrode PE overlaps only part of the drain electrode DE and does not overlap the gate electrode GE or the source electrode SE.

Figure 11:
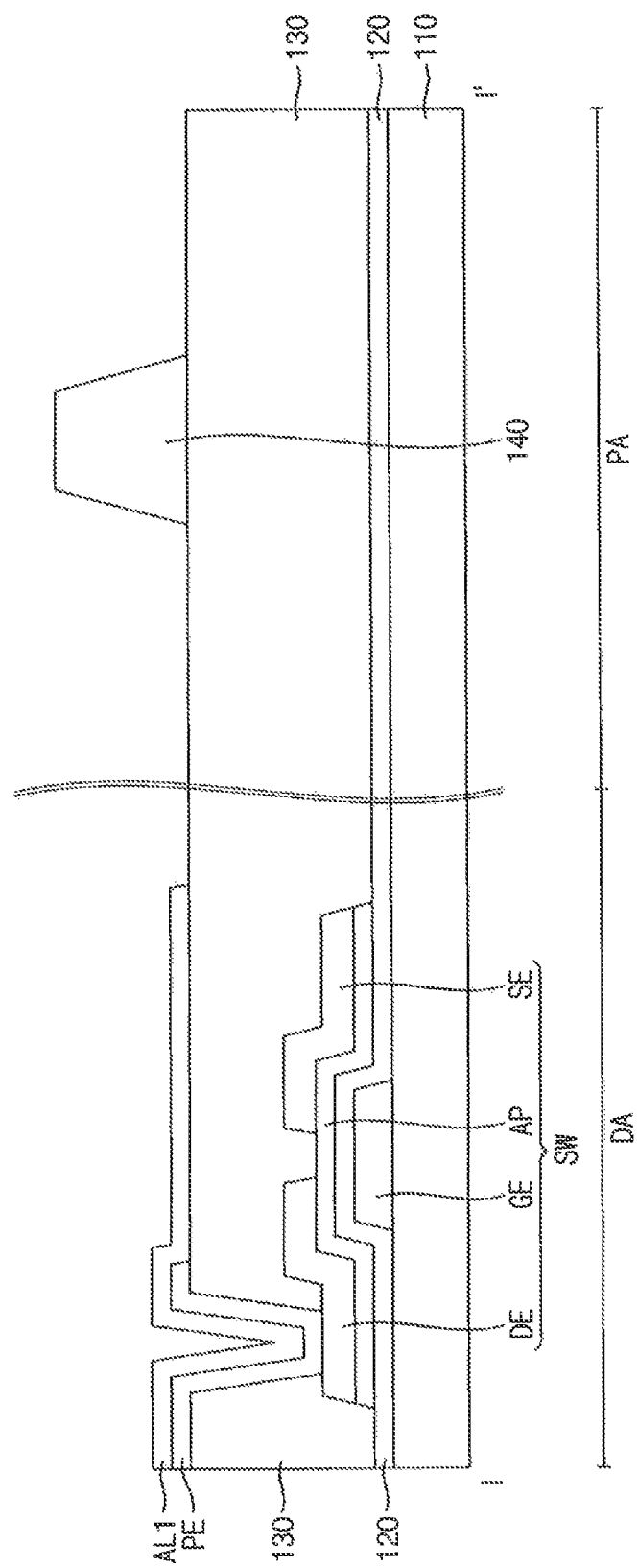

Referring to FIG. 11, a first alignment layer AL1 and a first lower column spacer 140 are formed on the first substrate 110 on which the pixel electrode PE is formed.

In an embodiment, the first alignment layer AL1 is formed on the organic layer 130 and the pixel electrode PE. The first alignment layer AL1 may include a polyamide-based compound, a polyelectrolyte-based compound or a mixture thereof.

In an exemplary embodiment, the first lower column spacer 140 is disposed on a peripheral area PA of the first substrate 110. In an exemplary embodiment, the first lower column spacer 140 includes two sides tilted toward the first substrate 110 at a certain angle. In an embodiment, the sides of the first lower column spacer 140 tilt toward one another at an acute angle. In an embodiment, the first lower column spacer 140 has a trapezoid shape in a cross-sectional view. In an embodiment, the bottom and top of the column spacer 140 are substantially parallel to one another.

Figure 12:
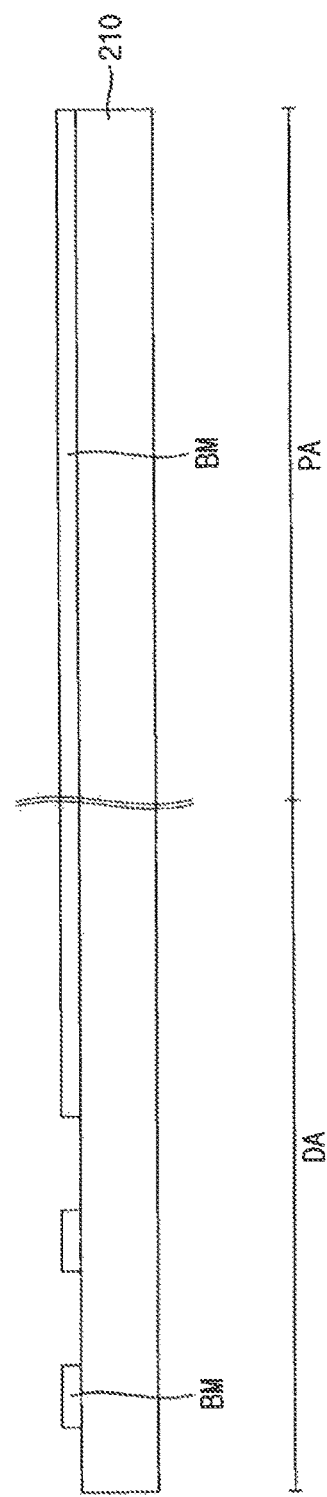

Referring to FIG. 12, a black matrix BM is formed on a second substrate 210.

The black matrix BM is formed on the second substrate 210. The black matrix BM may be disposed in the peripheral area PA and between color filters of the display area DA. The black matrix BM is configured to block light.

Figure 13:
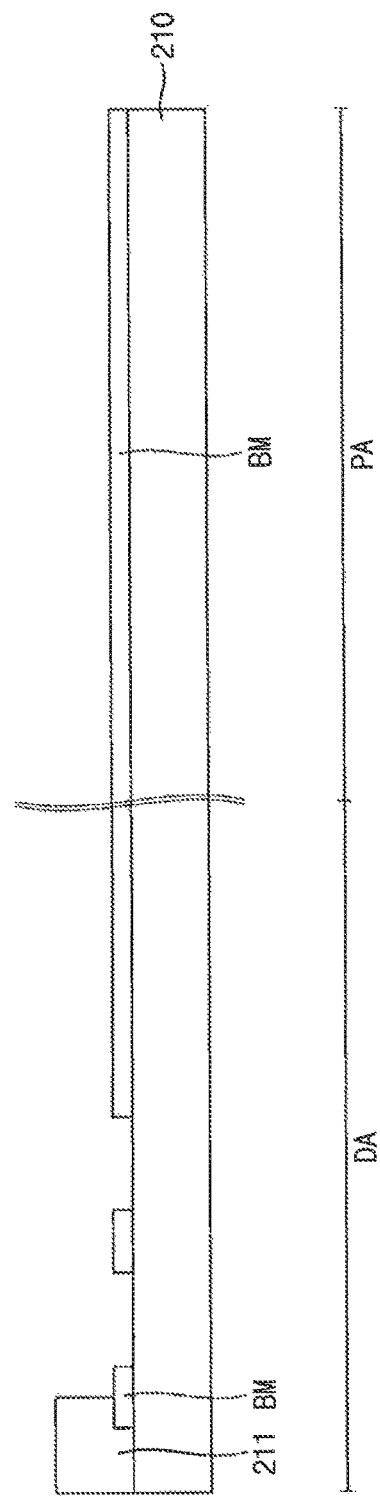

Referring to FIG. 13, a first color filter 211 is formed on the second substrate 210 on which the black matrix BM is formed.

The color filter layer according to a present exemplary embodiment includes a first color filter 211, a second color filter 212 and a third color filter 213. The first color filter 211 may be a red color filter including red material.

Figure 14:
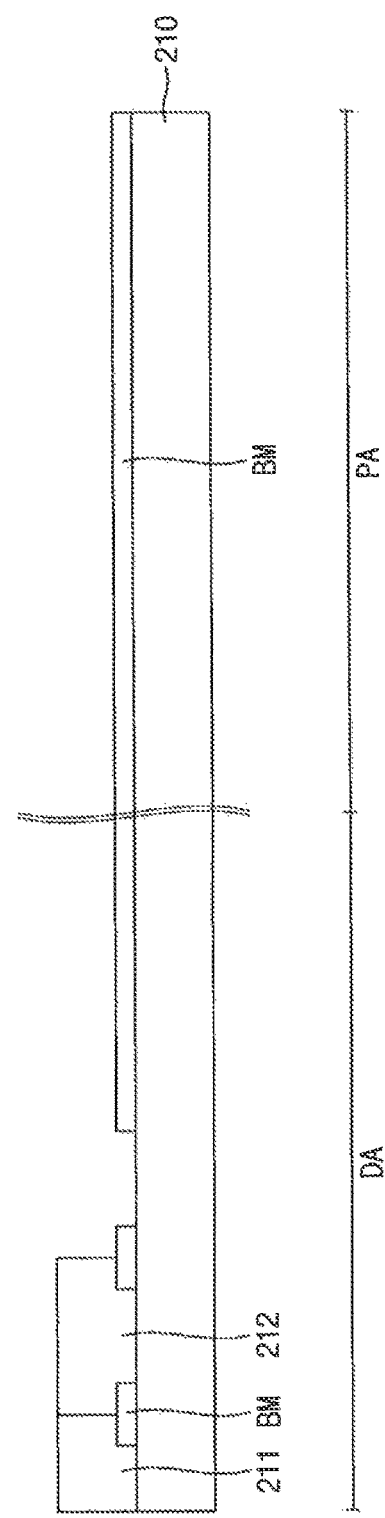

Referring to FIG. 14, a second color filter 212 is formed on the second substrate 210 on which the first color filter 211 is formed.

The second color filter 212 is disposed adjacent to the first color filter 211. The second color filter 212 may be a green color filter including green material. A height of the second color filter 212 may be substantially the same as a height of the first color filter 211. For example, the height of the second color filter 212 may be greater than or equal to 1.5 µm and less than or equal to 1.8 µm.

Figure 15:
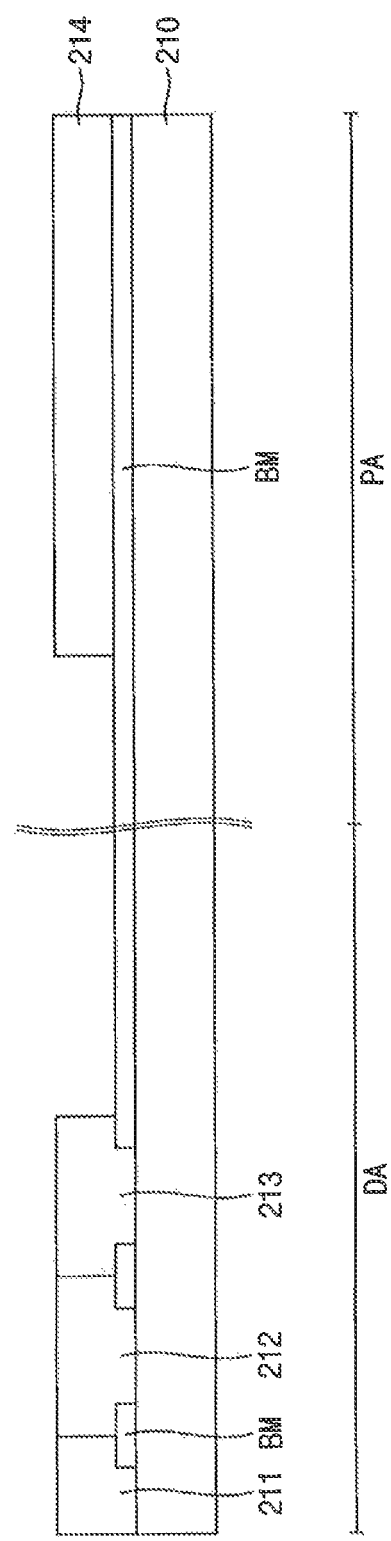

Referring to FIG. 15, a third color filter 213 and a dummy color filter layer 214 are formed on the second substrate 210 on which the second color filter 212 is formed.

The third color filter 213 is disposed adjacent to the second color filter 212. The third color filter 213 may be a blue color filter including blue material. For example, the height of the third color filter 213 may be greater than or equal to 1.7 µm and less than or equal to 2.3 µm. Alternatively, a height of the third color filter 213 may be substantially the same as a height of the first color filter 211 and the second color filter 212.

The dummy color filter layer 214 is disposed in the peripheral area PA of the display device. In a present exemplary embodiment, the dummy color filter layer 214 may include substantially the same material as the third color filter 213. The dummy color filter layer 214 may be formed by substantially the same manufacturing process as the third color filter 213. The dummy color filter layer 214 may have substantially the same height as the third color filter 213. For example, a height of the third color filter 213 may be greater than or equal to 1.7 µm and less than or equal to 2.3 µm, and a height of the dummy color filter layer 214 may be greater than or equal to 1.7 µm and less than or equal to 2.3 µm. In an alternate embodiment, the dummy color filter layer 214 includes substantially the same material as the first color filter 211 or the second color filter 212.

Figure 16:
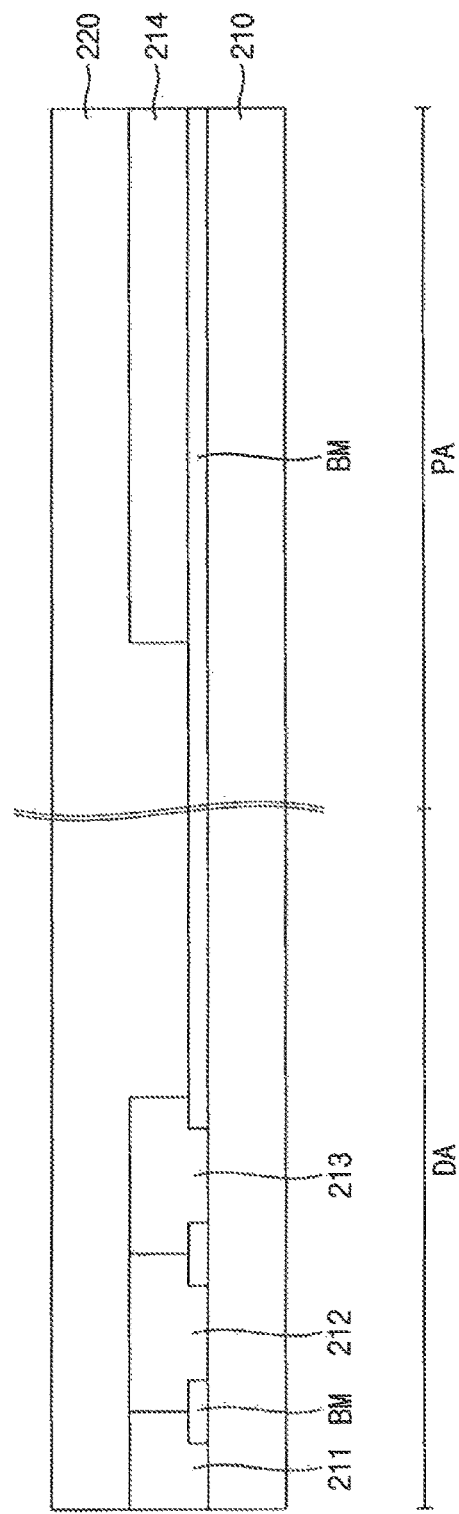

Referring to FIG. 16, an overcoated layer 220 is formed on the second substrate 210 on which the third color filter 213 and the dummy color filter layer 214 are formed.

The overcoated layer 220 is formed on the first through third color filters 211, 212, 213 and the dummy color filter layer 214. The overcoated layer 220 may minimize a step of the second substrate 210. In addition, the overcoated layer 220 may prevent impurities from flowing into the liquid crystal layer 300. In an alternate embodiment, the overcoated layer 220 is omitted. In an exemplary embodiment where the overcoated layer 220 is omitted, the dummy color filter layer 214 is extended to contact the third color filter 213, the column spaces 235, 231, and 235 are formed on the dummy color filter layer 214, and the alignment layer AL2 is formed on the color filters 211, 212, and 214, and the column spacer 235 formed on the dummy color filter 214.

Figure 17:
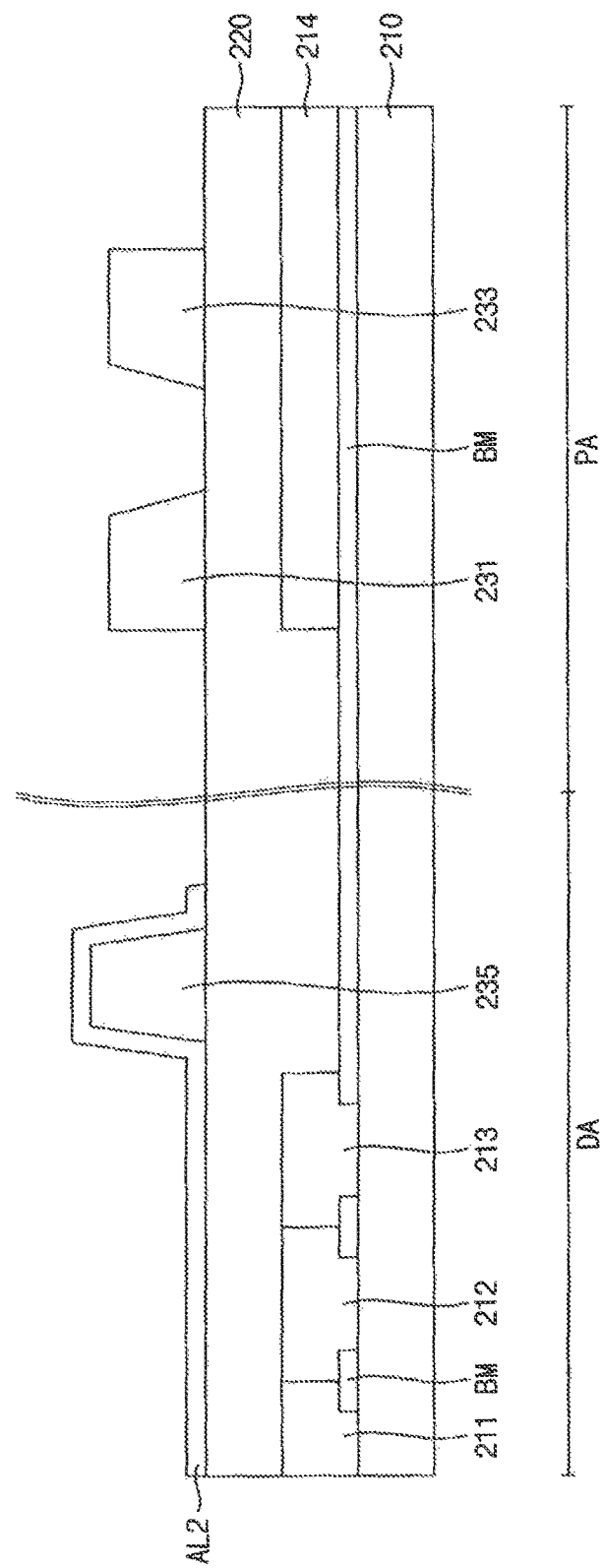

Referring to FIG. 17, a column spacer 235, a second alignment layer AL2, a first upper column spacer 231 and a second upper column spacer 233 are formed on the second substrate 210 on which the overcoated layer 220 is formed.

The column spacer 235 is disposed on the overcoated layer 220. The column spacer 235 is disposed in the display area DA and maintains a gap between the first substrate 110 and the second substrate 210. The column spacer 235 is disposed in the display area DA of the first substrate 110 and may be covered by the second alignment layer AL2.

The second alignment layer AL2 may be formed on the second substrate 210 on which the column spacer 235 is formed. The second alignment layer AL2 may include a polyamide-based compound, a polyelectrolyte-based compound or a mixture thereof.

In an exemplary embodiment of the inventive concept, the first upper column spacer 231 and the second upper column spacer 233 are disposed in the peripheral area PA. In an exemplary embodiment, the first upper column spacer 231 includes a side tilted toward the first substrate 110 at substantially the same angle at which the side of the first lower column spacer 140 is tilted and is disposed adjacent to a first side of the first lower column spacer 140. In an exemplary embodiment, the second upper column spacer 233 has substantially the same shape as the first upper column spacer 231 and is disposed adjacent to a second side of the first lower column spacer 140. The second side of the first lower column spacer 140 is opposite to the first side of the first lower column spacer 140. In an exemplary embodiment, the first upper column spacer 231 and the second upper column spacer 233 have a trapezoid shape in a cross-sectional view.

Figure 18:
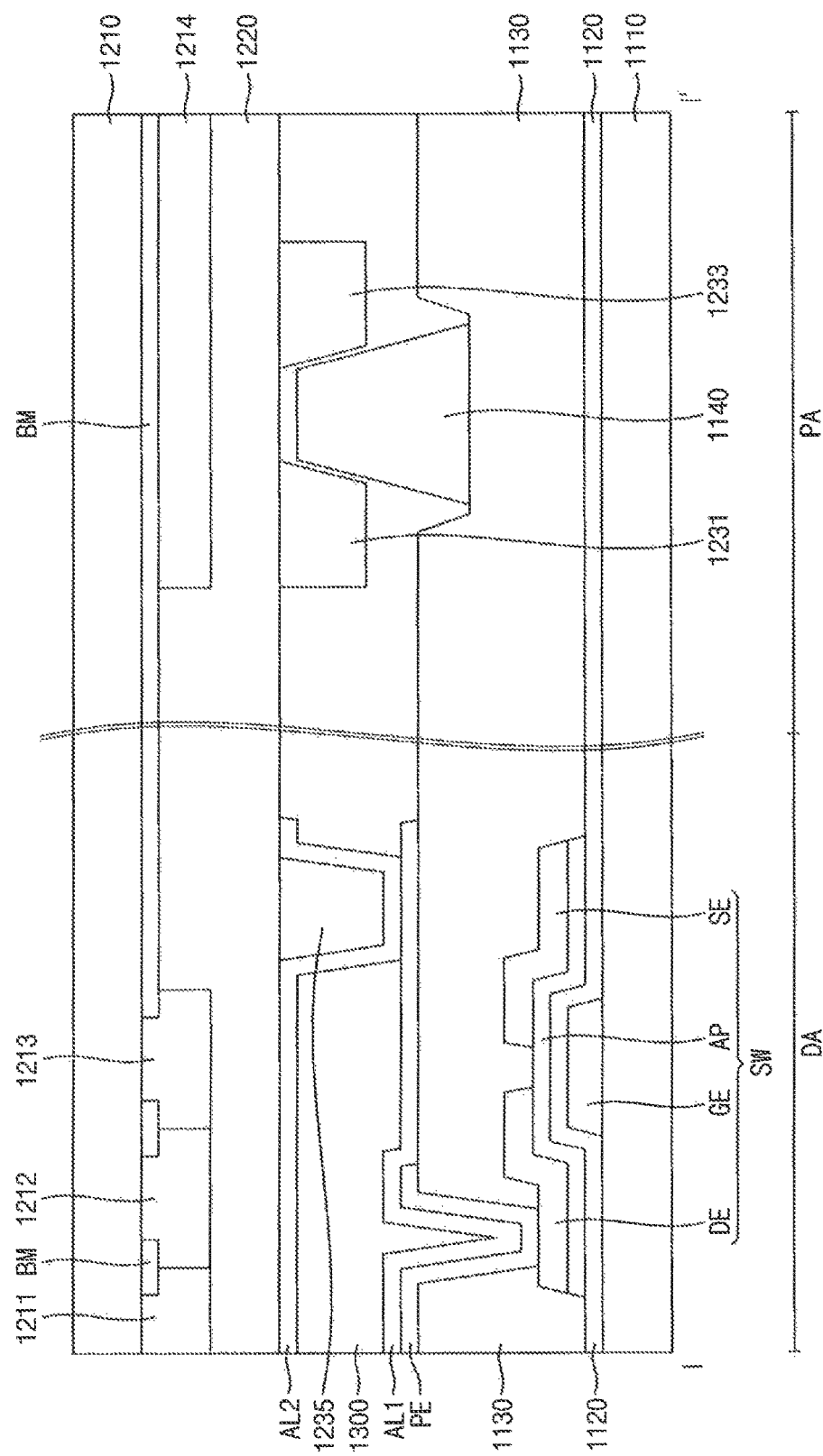
FIG. 18 is a cross-sectional view illustrating a display device according to an exemplary embodiment of the inventive concept.

FIG. 18 is a cross-sectional view illustrating a display device according to an exemplary embodiment of the inventive concept.

A display device according to a present exemplary embodiment of the inventive concept is substantially the same as the display device of FIGS. 1 to 17 except for an organic layer 1130 and a first lower column spacer 1140. Thus, the same reference numerals will be used to refer to same or like parts as those described in the previous exemplary embodiment and any further repetitive explanation concerning the above elements will be omitted.

The display device includes a first substrate 1110, a second substrate 1210 opposing the first substrate 1110 and a liquid crystal layer 1300 disposed between the first substrate 1110 and the second substrate 1210. The display device of FIG. 18 includes a first color filter 1211, a second color filter 1212, and a third second color filter 1213, and a dummy color filter, like the first color filter 211, the second color filter 212, the third color filter 213, and the dummy color filter 214 of FIG. 2, respectively. The display device of FIG. 18 includes an overcoated layer 1220 like the overcoated layer 220 of FIG. 2. The display device of FIG. 18 includes a column spacer 1235 like the column spacer 235 of FIG. 2. The display device of FIG. 18 includes a first upper column spacer 1231 and a second upper column spacer 1233 like the first upper column spacer 231 and the second upper column spacer 233 of FIG. 2, respectively.

A gate electrode GE, an insulation layer 1120, an active pattern AP, a source electrode SE, a drain electrode DE, an organic layer 1130, a pixel electrode PE, a first alignment layer AL1 and a first lower column spacer 1140 are disposed on the first substrate 1110.

The organic layer 1130 is formed on the source electrode SE and the drain electrode DE. The organic layer 1130 planarizes an upper surface of the first substrate 1110 so that problems due to a step such as disconnection of a signal line may be prevented. The organic layer 1130 may be an insulation layer including an organic material.

In an exemplary embodiment of the inventive concept, the organic layer 1130 includes a concave pattern portion TP. The concave pattern portion TP may be formed by patterning the organic layer 1130. For example, the concave pattern portion TP may be a recess, depression, or well within a portion of the organic layer 1130 within the peripheral area PA. The concave pattern portion TP may include two sides that slant towards the liquid crystal layer 1300. For example, the first side of the concave pattern portion TP may slant to the left at a certain angle (e.g., an obtuse angle) and the second side of the concave pattern portion TP may slant to the right at the certain angle (e.g., an obtuse angle).

The first lower column spacer 1140 is disposed on the concave pattern portion TP of the organic layer 1130. In an embodiment, a height of the first lower column spacer 1140 is greater than the height of the first lower column spacer 140 in FIG. 2, because the first lower column spacer 1140 is disposed on the concave pattern portion TP of the organic layer 1130.

Figure 19:
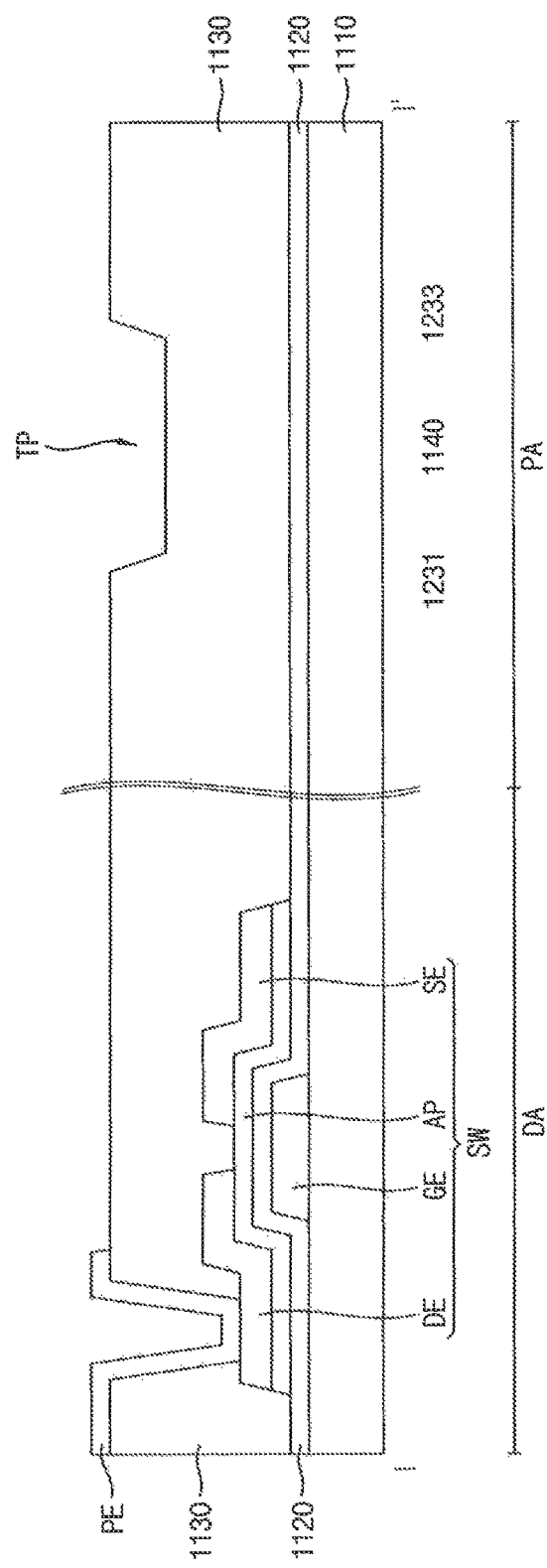
FIGS. 19 and 20 are cross-sectional views illustrating a method of manufacturing the display device of FIG. 18 according to an exemplary embodiment of the inventive concept.
Figure 20:
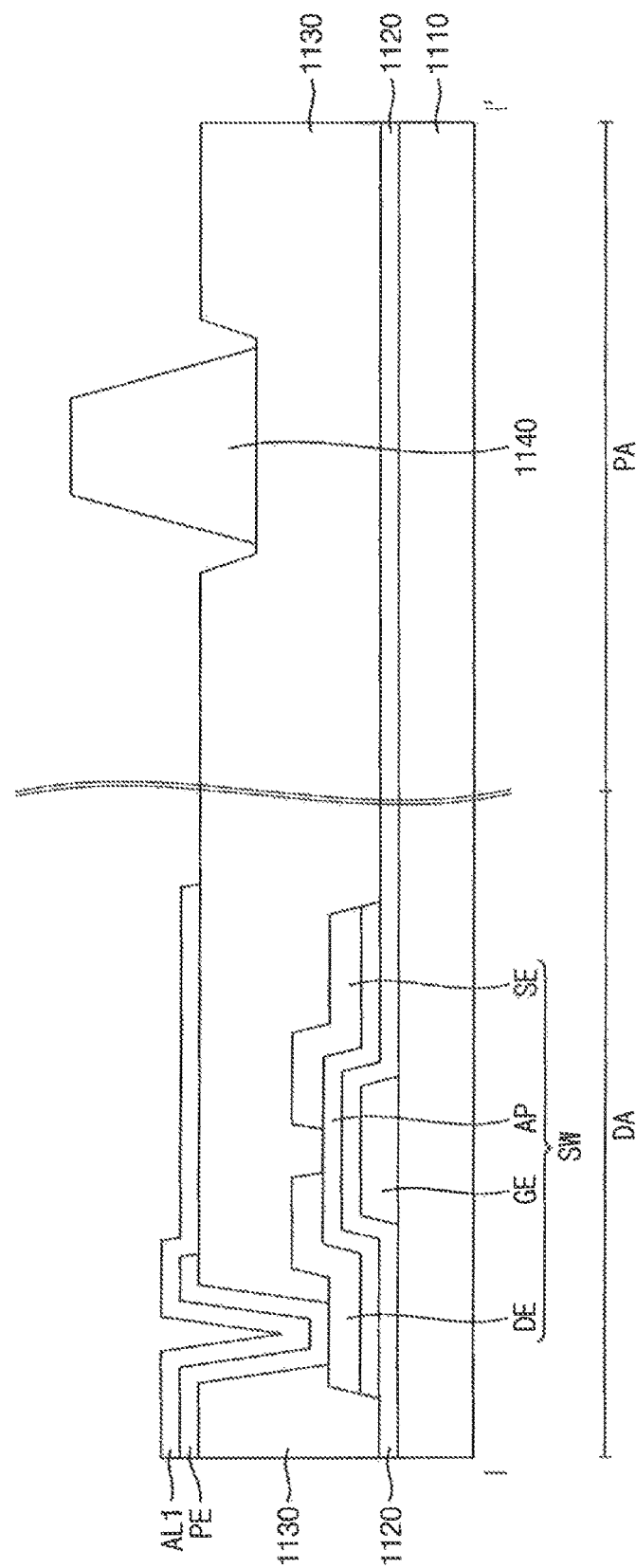

FIGS. 19 and 20 are cross-sectional views illustrating a method of manufacturing the display device of FIG. 18 according to an exemplary embodiment of the inventive concept.

A method of manufacturing a display device according to the present exemplary embodiment is substantially the same as the display device of FIGS. 7 to 17 except for a first lower column spacer 140. Thus, the same reference numerals will be used to refer to same or like parts as those described in the previous exemplary embodiment and any further repetitive explanation concerning the above elements will be omitted.

Referring to FIG. 19, a pixel electrode PE is formed on the first substrate 1110 on which the organic layer 1130 is formed. In addition, a concave pattern portion TP is formed by patterning the organic layer 1130. For example, a portion of the organic layer 1130 may be removed (e.g., etched) to form the concave pattern portion TP.

In an exemplary embodiment, the concave pattern portion TP is formed at substantially the same time as a contact hole partially exposing a drain electrode DE is formed.

The pixel electrode PE is disposed on the organic layer 1130. The pixel electrode PE is electrically connected to the drain electrode DE through the contact hole. The pixel electrode PE may include a transparent conductive material, such as indium tin oxide (ITO) and indium zinc oxide (IZO). In addition, the pixel electrode PE may include titanium (Ti) and/or molybdenum titanium (MoTi).

Referring to FIG. 20, a first alignment layer AL1 and a first lower column spacer 1140 are formed on the first substrate 1110 on which the concave pattern portion TP and the pixel electrode PE are formed.

The first alignment layer AL1 may be formed on the organic layer 1130 and the pixel electrode PE. The first alignment layer AL1 may include a polyamide-based compound, a polyelectrolyte-based compound or a mixture thereof.

The first lower column spacer 1140 is disposed on a peripheral area PA of the first substrate 1110. The first lower column spacer 1140 is disposed on the concave pattern portion TP. In an exemplary embodiment, the first lower column spacer 1140 includes two sides tilted toward the first substrate 1110 at a certain angle (e.g., an acute angle). For example, one of the two sides may slant to the right and the other of the sides may slant to the left. In an exemplary embodiment, the first lower column spacer 1140 has a trapezoid shape in a cross-sectional view.

Figure 21:
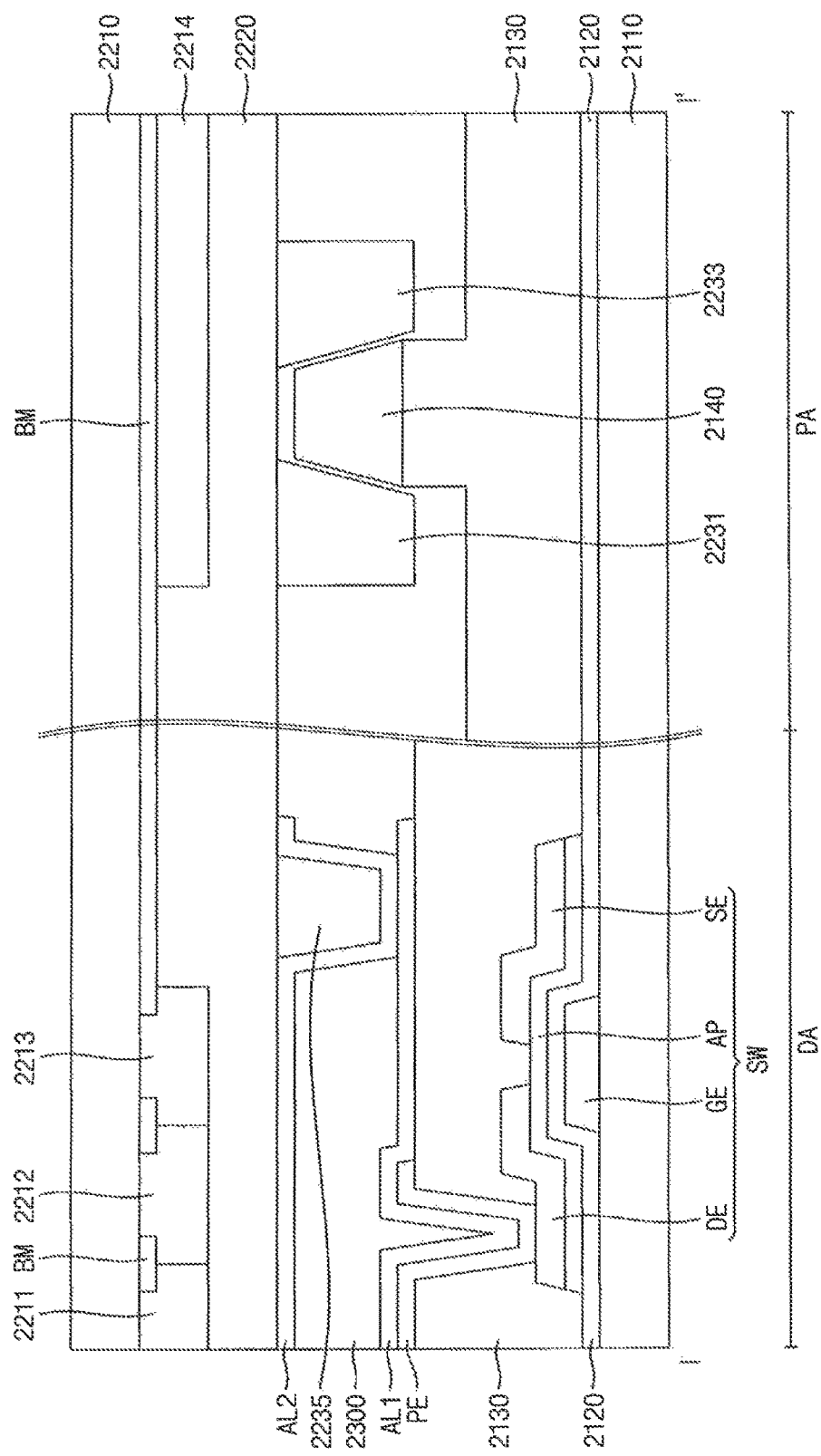
FIG. 21 is a cross-sectional view illustrating a display device according to an exemplary embodiment of the inventive concept.

FIG. 21 is a cross-sectional view illustrating a display device according to an exemplary embodiment of the inventive concept.

A display device according to a present exemplary embodiment of the inventive concept is substantially the same as the display device of FIGS. 1 to 17 except for an organic layer 2130, a first lower column spacer 2140, a first upper column spacer 2231 and a second upper column spacer 2233. Thus, the same reference numerals will be used to refer to same or like parts as those described in the previous exemplary embodiment and any further repetitive explanation concerning the above elements will be omitted.

The display device includes a first substrate 2110, a second substrate 2210 opposing the first substrate 2110 and a liquid crystal layer 2300 disposed between the first substrate 2110 and the second substrate 2210.

A gate electrode GE, an insulation layer 2120, an active pattern AP, a source electrode SE, a drain electrode DE, an organic layer 2130, a pixel electrode PE, a first alignment layer AL1 and a first lower column spacer 2140 are disposed on the first substrate 2110.

The organic layer 2130 is formed on the source electrode SE and the drain electrode DE. The organic layer 2130 planarizes an upper surface of the first substrate 2110 so that problems due to a step such as disconnection of a signal line may be prevented. The organic layer 2130 may be an insulation layer including an organic material.

The organic layer 2130 may include a convex pattern portion CP. The convex pattern portion CP may be referred to as a raised portion of the organic layer 2130. The convex pattern portion CP may be formed by patterning the organic layer 2130. In an embodiment, the pattern portion CP has a rectangular or substantially rectangular shape. In an embodiment, the height of the portion of the organic layer 2130 in the peripheral area PA is less than the height or the portion of the organic layer 2130 in the display area DA. In an embodiment, some of the organic layer 2130 in the peripheral area PA is removed (e.g., etched) to form the pattern portion CP.

The first lower column spacer 2140 is disposed on the convex pattern portion CP of the organic layer 2130. In an embodiment, a height of the first upper column spacer 2231 and the second upper column spacer 2233 is greater than the height of the first upper column spacer 231 and the second upper column spacer 233 in FIG. 2, because the first lower column spacer 2140 is disposed on the convex pattern portion CP of the organic layer 2130. In an embodiment, the width of the base of the first lower column spacer 2140 is the same as or substantially the same as an upper surface of the pattern portion CP. In an embodiment, the upper surface of the pattern portion CP is substantially flat. In an embodiment, the portion of the organic layer 2130 in the peripheral area PA has a middle upper surface disposed between a left upper surface and a right upper surface, where a height of the middle upper surface is greater than a height of the left and right upper surfaces. In an embodiment, the height of the left upper surface is the same as or substantially the same as the height of the right upper surface. In an embodiment, the height of the portion of the organic layer 2300 in the display area DA contacting the liquid crystal layer 2300 is greater than a height of the left and right upper surfaces.

FIGS. 22 to 25 are cross-sectional views illustrating a method of manufacturing the display device of FIG. 21.

A method of manufacturing a display device according to a present exemplary embodiment of the inventive concept is substantially the same as the display device of FIGS. 7 to 17 except for an organic layer 2130, a first lower column spacer 2140, a first upper column spacer 2231 and a second upper column spacer 2233. Thus, the same reference numerals will be used to refer to same or like parts as those described in the previous exemplary embodiment and any further repetitive explanation concerning the above elements will be omitted.

Figure 22:
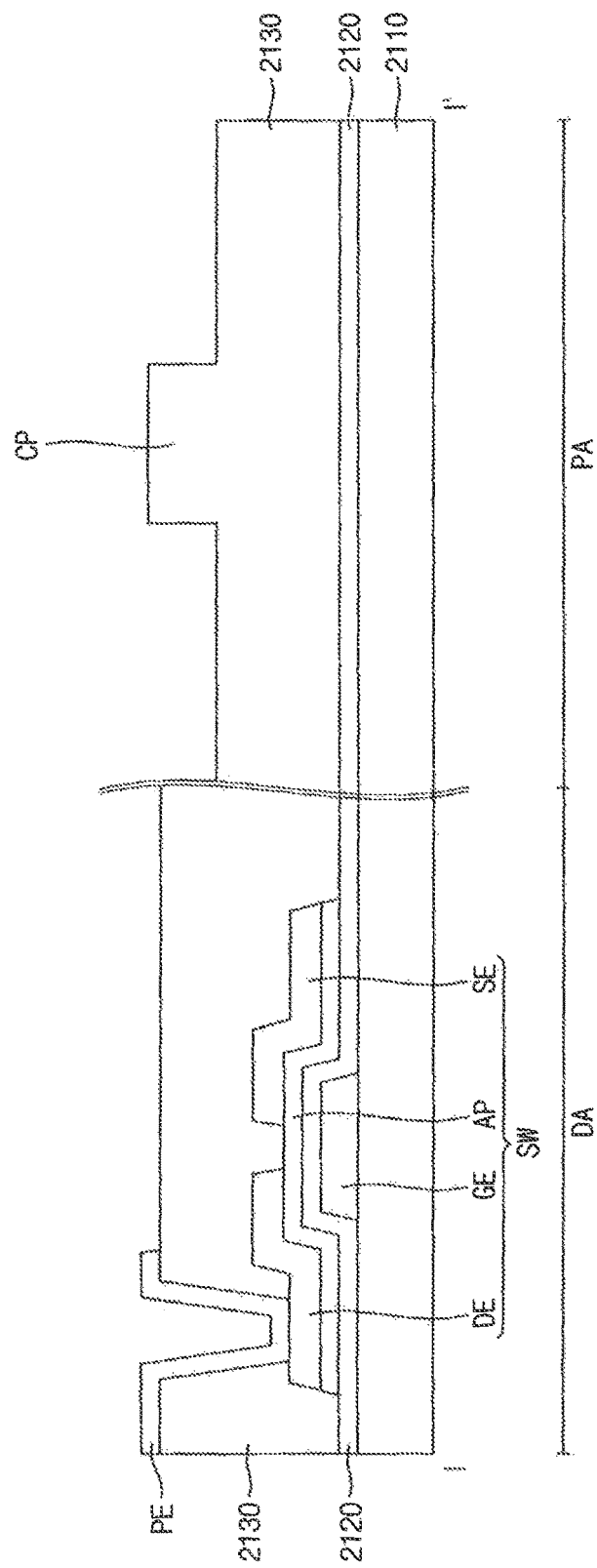
FIGS. 22 to 25 are cross-sectional views illustrating a method of manufacturing the display device of FIG. 21 according to an exemplary embodiment of the inventive concept.

Referring to FIG. 22, a pixel electrode PE is formed on the first substrate 2110 on which the organic layer 2130 is formed. In addition, a convex pattern portion CP is formed by patterning the organic layer 2130.

In an exemplary embodiment, the convex pattern portion CP is formed at substantially the same time as a contact hole partially exposing a drain electrode DE is formed.

The pixel electrode PE is disposed on the organic layer 2130. The pixel electrode PE is electrically connected to the drain electrode DE through the contact hole. The pixel electrode PE may include a transparent conductive material, such as indium tin oxide (ITO) and indium zinc oxide (IZO). In addition, the pixel electrode PE may include titanium (Ti) and/or molybdenum titanium (MoTi).

Figure 23:
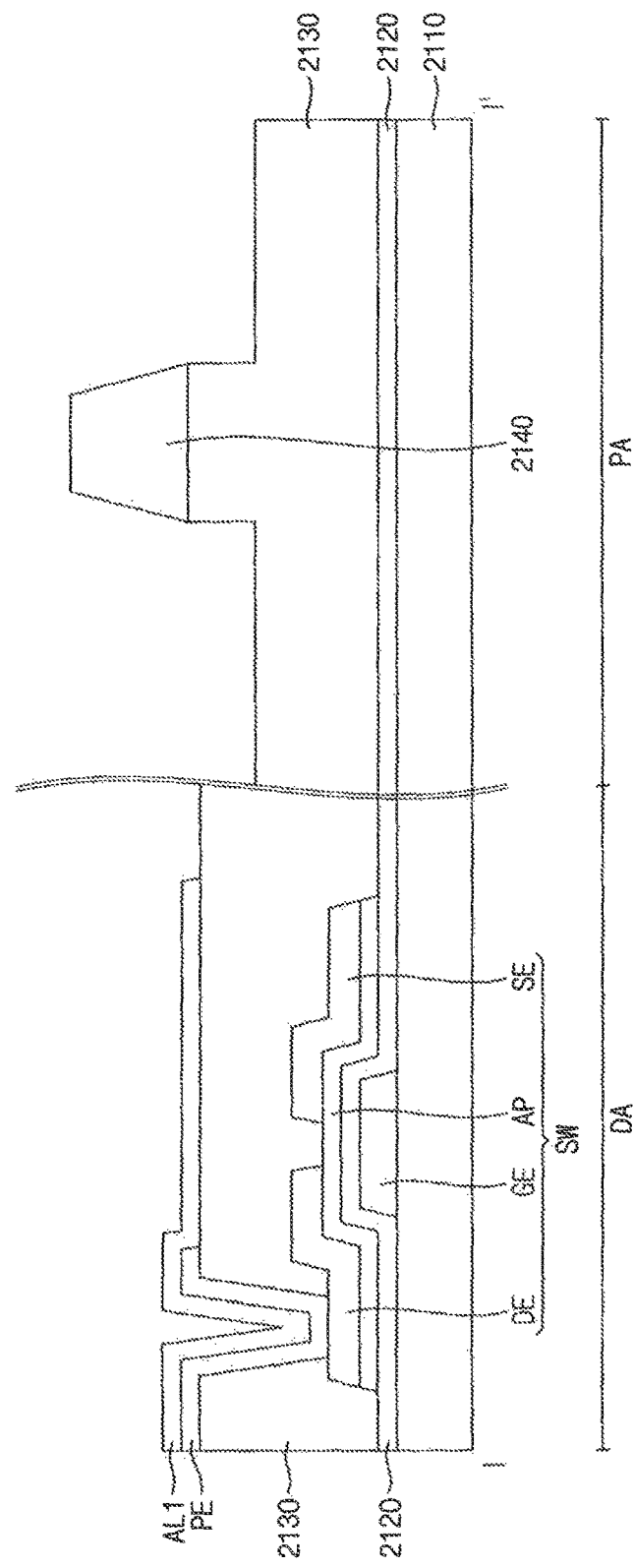

Referring to FIG. 23, a first alignment layer AL1 and a first lower column spacer 2140 are formed on the first substrate 2110 on which the convex pattern portion CP and the pixel electrode PE are formed.

The first alignment layer AL1 may be formed on the organic layer 2130 and the pixel electrode PE. The first alignment layer AL1 may include a polyamide-based compound, a polyelectrolyte-based compound or a mixture thereof.

The first lower column spacer 2140 is disposed on a peripheral area PA of the first substrate 2110. The first lower column spacer 2140 is disposed on the convex pattern portion CP. In an exemplary embodiment, the first lower column spacer 2140 includes two sides tilted toward the first substrate 2110 at a certain angle (e.g., an acute angle). For example, one of the two sides may slant to the left and the other of the two sides may slant to the right. In an embodiment, the first lower column spacer 2140 has a trapezoid shape in a cross-sectional view.

Figure 24:
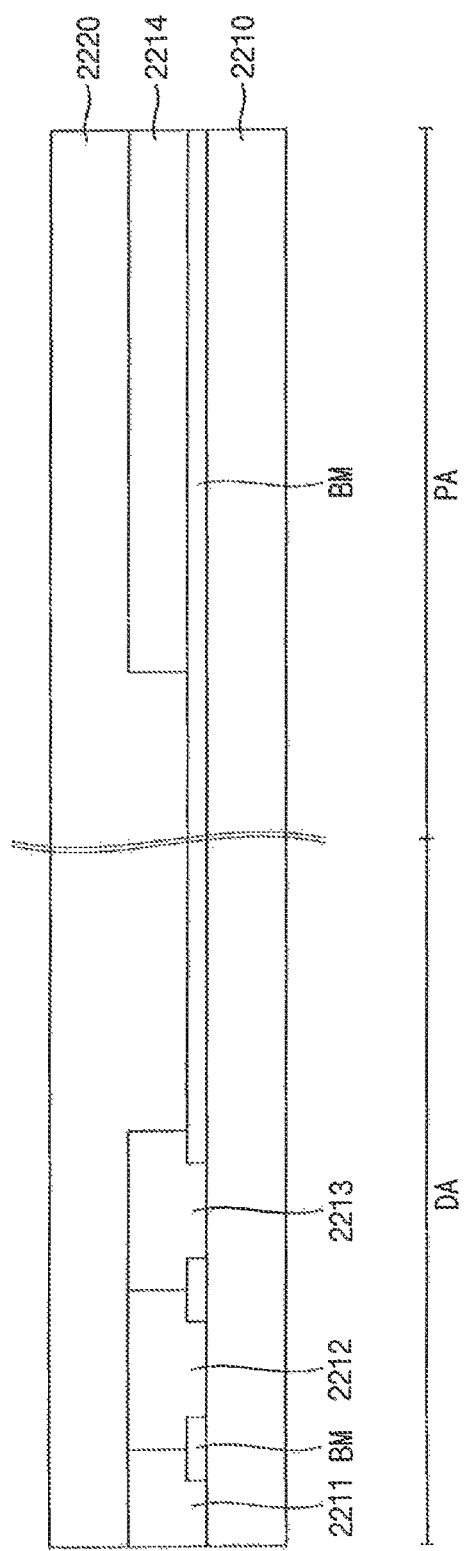

Referring to FIG. 24, an overcoated layer 2220 is formed on the second substrate 2210 on which the third color filter 2213 and the dummy color filter layer 2214 are formed.

The overcoated layer 2220 is formed on the first through third color filters 2211, 2212, 2213 and the dummy color filter layer 2214. The overcoated layer 2220 may minimize a step of the second substrate 2210. In addition, the overcoated layer 2220 may prevent impurities from lowing into the liquid crystal layer 2300. In an alternate embodiment, the overcoated layer 2220 is omitted.

Figure 25:
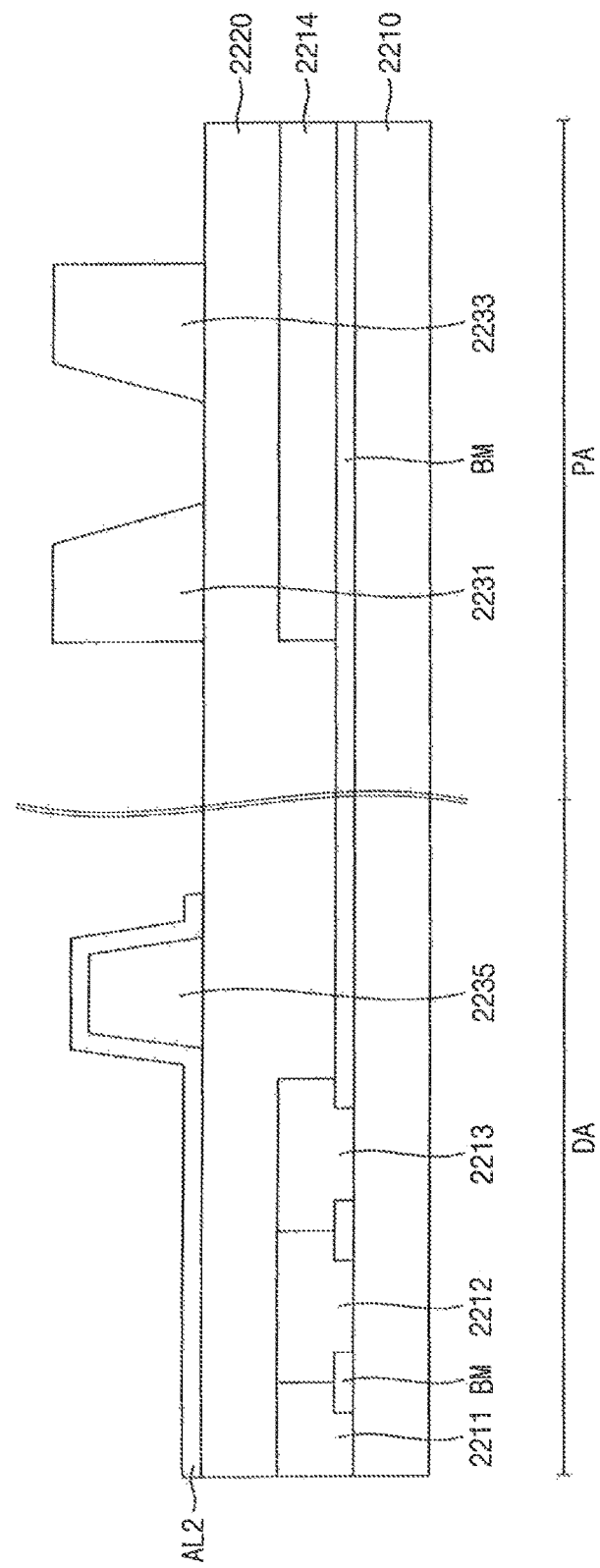

Referring to FIG. 25, a column spacer 2235, a second alignment layer AL2, a first upper column spacer 2231 and a second upper column spacer 2233 are formed on the second substrate 2210 on which the overcoated layer 2220 is formed.

The column spacer 2235 is disposed on the overcoated layer 2220. The column spacer 2235 is disposed in the display area DA and maintains a gap between the first substrate 2110 and the second substrate 2210. The column spacer 2235 is disposed in the display area DA of the first substrate 2110 and may be covered by the second alignment layer AL2.

The second alignment layer AL2 may be formed on the second substrate 2210 on which the column spacer 2235 is formed. The second alignment layer AL2 may include a polyamide-based compound, a polyelectrolyte-based compound or a mixture thereof.

The first upper column spacer 2231 and the second upper column spacer 2233 are disposed in the peripheral area PA. The first upper column spacer 2231 includes a side tilted toward the first substrate 2110 at substantially the same angle at which the side of the first lower column spacer 2140 is tilted and is disposed adjacent to a first side of the first lower column spacer 2140. The second upper column spacer 2233 has substantially the same shape as the first upper column spacer 2231 and is disposed adjacent to a second side of the first lower column spacer 2140. The second side of the first lower column spacer 2140 is opposite to the first side of the first lower column spacer 2140. In an exemplary embodiment, the first upper column spacer 2231 and the second upper column spacer 2233 have a trapezoid shape in a cross-sectional view.

The first lower column spacer 2140 is disposed on the convex pattern portion CP of the organic layer 2130. In an exemplary embodiment, a height of the first upper column spacer 2231 and the second upper column spacer 2233 is greater than the height of the first upper column spacer 2231 and the second upper column spacer 2233 in FIG. 2, because the first lower column spacer 2140 is disposed on the convex pattern portion CP of the organic layer 2130.

According to at least one embodiment of the inventive concept, a display device includes a first lower column spacer disposed on a first substrate and extending in a first direction and first and second upper column spacers disposed on a second substrate and extending in the first direction. The first lower column spacer may be alternately arranged with the first and second upper column spacers in a cross-sectional view. Thus, under an external force in a second direction crossing the first direction, the first lower column spacer is supported by the first and second upper column spacers so that a panel (e.g., a display panel) is prevented from being deformed. In other words, the panel can be prevented from being deformed when an external force is applied in a horizontal direction.

In addition, the display device may further include a second lower column spacer and third and fourth upper column spacers extending in the second direction and having substantially the same shapes as the first lower column spacer and the first and second upper column spacers respectively. Thus, under an external force in the first direction, the panel is prevented from being deformed.

As a result, the panel can be prevented from being deformed when an external force is applied either in the first direction or in the second direction.

Although a few exemplary embodiments of the present inventive concept have been described above, those skilled in the art will readily appreciate that many modifications are possible in the exemplary embodiments without materially departing from the teachings of the present inventive concept. Accordingly, all such modifications are intended to be included within the scope of the present inventive concept.

What is claimed is:

1. A display device comprising:
   a liquid crystal layer;
   a first substrate comprising:
      a first lower column spacer disposed in a first peripheral area of the display device, extending in a first direction and comprising first and second opposing slanted sides;
   a second substrate opposing the first substrate, the second substrate comprising:
      a first upper column spacer disposed in the first peripheral area, extending in the first direction, comprising a slanted side, and disposed adjacent to the first slanted side of the first lower column spacer; and
      a second upper column spacer disposed adjacent to the second slanted side of the first lower column spacer, comprising a slanted side,
   wherein the first peripheral area is disposed outside a display area of the display device,
   wherein the liquid crystal layer is disposed between the first substrate and at least one of a bottom side of the first upper column spacer and a bottom side of the second upper column spacer, wherein the first lower column spacer and the first and second upper column spacers are positioned so that at least one of the first and second slanted sides of the first lower column spacer contact at least one of the slanted sides of the first and second upper column spacers, respectively when an external force is applied in a second direction crossing the first direction.

2. The display device of claim 1, further comprising:
a second lower column spacer disposed in a second peripheral area of the display device outside the display area, extending in the second direction and comprising third and fourth opposing slanted sides;
a third upper column spacer disposed in the second peripheral area, extending in the second direction, comprising a slanted side, and disposed adjacent to the third slanted side of the second lower column spacer; and
a fourth upper column spacer disposed adjacent to the fourth slanted side of the second lower column spacer.

3. The display device of claim 2, further comprising:
a switching element disposed on the first substrate and comprising a gate electrode, a source electrode and a drain electrode, the source electrode and the drain electrode overlapping with the gate electrode; and
an organic layer disposed on the switching element.

4. The display device of claim 3, wherein the first lower column spacer is disposed on the organic layer.

5. The display device of claim 3, wherein the organic layer comprises a concave pattern portion extending in the first direction,
wherein the first lower column spacer is disposed on the concave pattern portion, and
wherein the concave pattern portion includes a slanted edge that overlaps one of the first upper column spacer and the second upper column spacer.

6. The display device of claim 3, wherein the organic layer comprises a convex pattern portion extending in the first direction, and
wherein the first lower column spacer is disposed on the convex pattern portion,
wherein an upper side of the convex pattern portion is higher than a lower side of the first upper column spacer and the second upper column spacer.

7. The display device of claim 3, wherein the second lower column spacer is disposed on the organic layer.

8. The display device of claim 3, wherein the organic layer comprises a concave pattern portion extending in the second direction, and
wherein the second lower column spacer is disposed on the concave pattern portion.

9. The display device of claim 3, wherein the organic layer comprises a convex pattern portion extending in the second direction, and
wherein the second lower column spacer is disposed on the convex pattern portion.

10. The display device of claim 1, further comprising:
a color filter layer disposed in the display area on the second substrate;
a dummy color filter layer disposed in the first peripheral area on the second substrate and disposed on substantially a same layer as the color filter layer; and
an overcoated layer disposed on the color filter layer and the dummy color filter layer,
wherein the first and second upper column spacers are disposed on the overcoated layer.

11. A method of manufacturing a display device, the method comprising:
forming a first lower column spacer in a first peripheral area on a first substrate, the first lower column spacer extending in a first direction and comprising first and second opposing slanted sides;
forming first and second upper column spacers in the first peripheral area on a second substrate, the first upper column spacer extending in the first direction and comprising a slanted side, the second upper column spacer comprising a slanted side; and
forming a liquid crystal layer such that it is disposed between the first substrate and at least one of a bottom side of the first upper column spacer and a bottom side of the second upper column spacer,
wherein the first substrate opposes the second substrate and the first peripheral area is disposed outside a display area of the display device,
wherein the first lower column spacer and the first and second upper column spacers are positioned so that at least one of the first and second slanted sides of the first lower column spacer contract at least one of the slanted sides of the first and second upper column spacers, respectively when an external force is applied in a second direction crossing the first direction.

12. The method of claim 11, further comprising:
forming a second lower column spacer in a second peripheral area on the first substrate, the second lower column spacer extending in the second direction and comprising third and fourth opposing slanted sides; and
forming third and fourth upper column spacers in the second peripheral area on the second substrate, the third upper column spacer extending in the second direction and comprising a slanted side.

13. The method of claim 12, further comprising:
forming a switching element on the first substrate, the switching element comprising a gate electrode, a source electrode and a drain electrode, the source electrode and the drain electrode overlapping with the gate electrode; and
forming an organic layer on the switching element.

14. The method of claim 13, further comprising:
forming a concave pattern portion on the organic layer, the concave pattern portion extending in the first direction,
wherein the first lower column spacer is disposed on the concave pattern portion.

15. The method of claim 13, further comprising:
forming a convex pattern portion on the organic layer, the convex pattern portion extending in the first direction,
wherein the first lower column spacer is disposed on the convex pattern portion.

16. The method of claim 13, further comprising:
forming a concave pattern portion on the organic layer, the concave pattern portion extending in the second direction,
wherein the second lower column spacer is disposed on the concave pattern portion.

17. The method of claim 13, further comprising:
forming a convex pattern portion on the organic layer, the convex pattern portion extending in the second direction,
wherein the second lower column spacer is disposed on the convex pattern portion.

18. The method of claim 11, further comprising:
forming a color filter layer on the display area of the second substrate and a dummy color filter layer on the peripheral area of the second substrate; and forming an overcoated layer on the color filter layer and the dummy color filter layer, wherein the first and second upper column spacers are disposed on the overcoated layer.

19. A display device comprising:

a first substrate;

an organic layer disposed on the first substrate in a peripheral area of the display device outside a display area of the display device;

a lower column spacer having a trapezoidal shape disposed on the organic layer, the trapezoidal shape comprising first and second slanted and opposing sides;

a second substrate;

a first upper column spacer disposed on the second substrate in the peripheral area, the first upper column spacer having a third side adjacent to the first slanted side of the trapezoidal shape; and a second upper column spacer disposed on the second substrate in the peripheral area, the second upper column spacer having a fourth side adjacent to the second slanted side of the trapezoidal shape, wherein a height of the first upper column spacer and the second upper column spacer, is less than a height of the lower column spacer, wherein the first and second upper column spacers are spaced apart from one another a distance that enables the lower column spacer to mate with the first and second upper column spacers, respectively.

20. The display device of claim 19, wherein the first slanted side of the trapezoidal shape and the third side of the first upper column spacer slant to the right, and the second slanted side of the trapezoidal shape and the fourth side of the second upper column spacer slant to the left.

* * * * *